(12) United States Patent
Jung

(10) Patent No.: US 8,300,889 B2
(45) Date of Patent: Oct. 30, 2012

(54) METHOD AND APPARATUS FOR DETECTING TARGET PARKING POSITION BY USING TWO REFERENCE POINTS, AND PARKING ASSIST SYSTEM USING THE SAME

(75) Inventor: Ho-Gi Jung, Seoul (KR)

(73) Assignee: Mando Corporation, Pyeongtaek (KR)

( * ) Notice: Subject to any disclaimer, the term of this patent is extended or adjusted under 35 U.S.C. 154(b) by 856 days.

(21) Appl. No.: 12/368,708

(22) Filed: Feb. 10, 2009

(65) Prior Publication Data
US 2009/0207045 A1 Aug. 20, 2009

(30) Foreign Application Priority Data
Feb. 14, 2008 (KR) .................. 10-2008-0013615

(51) Int. Cl.
*G06K 9/00* (2006.01)
(52) U.S. Cl. .................. 382/103; 348/169; 701/28
(58) Field of Classification Search .......... 382/100, 382/103, 106, 181, 190, 195, 199, 203, 206; 348/113, 135, 143, 169–172; 701/23, 28, 701/200

See application file for complete search history.

(56) References Cited

U.S. PATENT DOCUMENTS

| | | | |
|---|---|---|---|
| 6,285,297 B1 * | 9/2001 | Ball | 340/932.2 |
| 6,650,250 B2 * | 11/2003 | Muraki | 340/932.2 |
| 7,026,954 B2 * | 4/2006 | Slemmer et al. | 340/932.2 |
| 7,053,795 B2 * | 5/2006 | Maemura et al. | 340/932.2 |
| 2002/0175832 A1 * | 11/2002 | Mizusawa et al. | 340/932.2 |
| 2005/0083212 A1 * | 4/2005 | Chew | 340/932.2 |
| 2006/0287825 A1 * | 12/2006 | Shimizu et al. | 701/216 |
| 2009/0260907 A1 * | 10/2009 | Moshchuk et al. | 180/167 |

* cited by examiner

*Primary Examiner* — Anand Bhatnagar
(74) *Attorney, Agent, or Firm* — McDermott Will & Emery LLP

(57) ABSTRACT

Disclosed are a method and an apparatus for detecting a target parking position by using two reference points, and a parking assist system using the same. The apparatus includes: a first unit for receiving an input image obtained by photographing a parking space and the two reference points in the input image; a second unit for detecting a target pattern of parking slot markings by using each of the two reference points; and a third unit for detecting the target parking position by using the detected target patterns.

10 Claims, 25 Drawing Sheets

(A) (B)

(A) (B) (C) (D)

(A)          (B)

(A)

(B)

(A)

(B)

(A)

(B)

(A)

(B)

METHOD AND APPARATUS FOR DETECTING TARGET PARKING POSITION BY USING TWO REFERENCE POINTS, AND PARKING ASSIST SYSTEM USING THE SAME

CROSS-REFERENCE TO RELATED APPLICATION

This non-provisional application claims priority under 35 U.S.C. §119(a) on Patent Application No. 10-2008-0013615 filed in Korea on Feb. 14, 2008, the entire contents of which are hereby incorporated by reference.

BACKGROUND OF THE INVENTION

1. Technical Field

The present disclosure relates to a method and an apparatus for detecting a target parking position by using two reference points (or seed points), and a parking assist system using the same. More particularly, the embodiments of the invention relates to a method and an apparatus for detecting a target parking position, and a parking assist system using the same, in which a parking space is photographed by a camera mounted on a vehicle, parking slot markings are recognized by using two reference points, which are input by a driver and designate an entrance of a target parking position in the obtained input image, and the target parking position is then detected based on the two reference points and the recognized parking slot markings.

2. Background of Disclosure

A semiautomatic parking system is a system which automates a required steering operation and increases a driver's convenience during parking. Since drivers are very interested in parking assist systems, leading automakers and auto-parts makers have developed parking assist systems in various forms.

When parking a car by using the parking assist system as described above, it is essential for a driver to first select a target parking position where he/she intends to park the car. Therefore, many automakers and auto-parts makers continue to conduct researches on methods for selecting a target parking position in which a driver intends to park his/her own car.

The methods for selecting a target parking position includes a user interface-based method in which a driver directly sets a target parking position on an image around a vehicle, a parking slot marking-based method which automatically recognizes parking slot markings in images around a vehicle and sets a target parking position, a free space between parked vehicles-based method which sets a target parking position to an empty parking space between two parked vehicles, an infrastructure-based method which recognizes an empty parking space by using a Global Positioning System (GPS), a digital map, etc., and others, all of which have been developed and are used.

The parking slot marking-based method as described above includes a method for setting a target parking position by using one touch based on parking slot markings. In this method, when selecting a point (i.e. when once touching a position in which a driver intends to park his/her own vehicle) on an image obtained by a camera of a vehicle, a device for setting a target parking position automatically sets the target parking position by using the selected point.

However, the conventional method for setting a target parking position by using one touch based on parking slot markings should perform processes, such as fish-eye lens correction, the generation of a bird's-eye view image, etc., on all images obtained by the camera. Accordingly, the amount of calculations performed by the device for setting the target parking position increases by a large amount, so that the capabilities of a memory and a microprocessor, which are necessary to perform the calculations, increase by a large amount.

Also, it is assumed in the conventional methods as described above that a straight line separates a parking slot from a road. Accordingly, it is difficult to apply the conventional methods to parking slot markings in another form which does not include a straight line separating a parking slot from a road.

DISCLOSURE OF THE INVENTION

One embodiment of the invention provides a method and an apparatus for detecting a target parking position, and a parking assist system using the same, in which a parking space is photographed by a camera mounted on a vehicle, parking slot markings are recognized by using two reference points, which are input by a driver and designate an entrance of a target parking position in the obtained input image, and the target parking position is then detected based on the two reference points and the recognized parking slot markings.

Another embodiment provides an apparatus for detecting a target parking position by using two reference points, the apparatus including: a first unit for receiving an input image obtained by photographing a parking space and the two reference points in the input image; a second unit for detecting a target pattern of parking slot markings by using each of the two reference points; and a third unit for detecting the target parking position by using the detected target patterns.

Further, in accordance with another aspect of the embodiment, there is provided a system for assisting parking of a vehicle, the system including: a camera for generating and providing an input image upon photographing a parking space; a user interface unit for receiving as an input and delivering two reference points in the input image; a target parking position detection unit for detecting a target pattern of parking slot markings by using each of the two reference points upon receiving the input image and the two reference points, detecting a target parking position by using the detected target patterns, and providing the detected target parking position; a sensing unit having multiple sensors for recognizing a driving situation of the vehicle, the sensing unit generating and providing information on the driving situation of the vehicle; a parking assist control unit for receiving the information on the driving situation of the vehicle from the sensing unit and estimating a position of the vehicle based on the received information, receiving the target parking position to generate both path planning and a control signal for parking the vehicle in the target parking position, and providing the generated path planning and control signal; an active steering unit for steering the vehicle in response to the control signal when receiving the control signal; and an active braking unit for braking the vehicle in response to the control signal when receiving the control signal.

In accordance with further aspect of the embodiment, there is provided a method for detecting a target parking position by an apparatus for detecting the target parking position, the apparatus being connected to a camera and a user interface mounted on a vehicle, the method including the steps of: a) receiving an input image obtained by photographing a parking space from the camera; b) receiving two reference points in the input image from the user interface; c) detecting a target pattern of parking slot markings by using each of the two reference points; and d) detecting the target parking position by using the detected target patterns, and providing the detected target parking position.

As described above, according to the embodiments, a driver directly indicates an entrance of a target parking position in which he/she intends to park. Accordingly, it is possible to restrict performing fish-eye lens correction and generating a bird's-eye view image to a small region around a spot that the driver has indicated. With this, it is possible to minimize a necessary amount of a memory and necessary capabilities of both hardware (e.g. a microprocessor) and software, which are included in the apparatus for detecting a target parking position and the system for assisting parking by using the apparatus, both of which are mounted in a vehicle. As a result, the amount of calculations is small, so that processing speed can be improved.

Also, according to the embodiments, it is not necessary to assume that a straight line separates a parking lot from the road. Therefore, parking slot markings of various patterns can be recognized, so that the target parking can be detected.

BRIEF DESCRIPTION OF THE DRAWINGS

The above and other exemplary features, aspects and advantages of the present disclosure will become more apparent from the following detailed description taken in conjunction with the accompanying drawings in which.

DETAILED DESCRIPTION OF THE EXEMPLARY EMBODIMENTS

Figure 1:
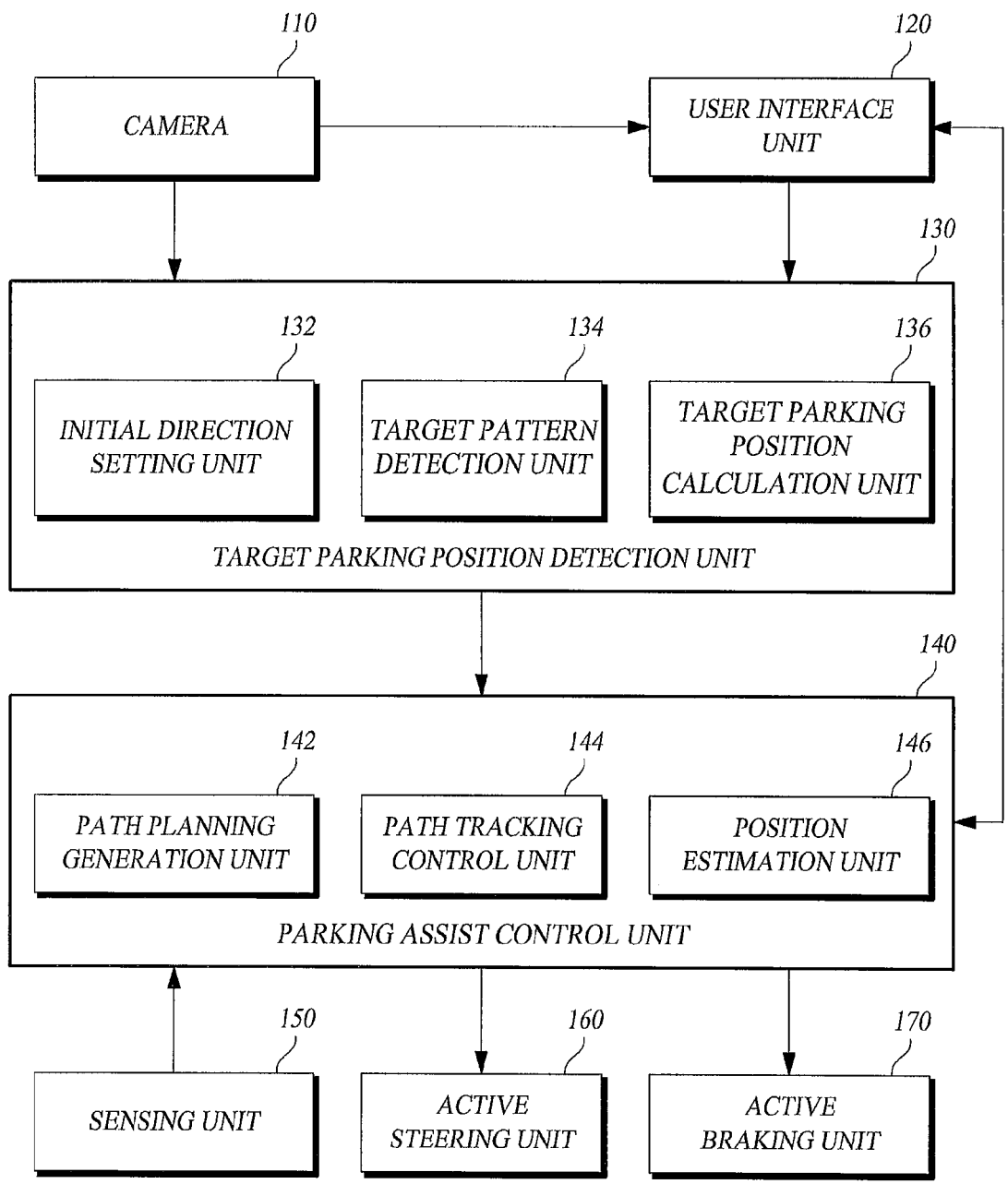
FIG. 1 is a block diagram illustrating a brief configuration of a parking assist system using an apparatus for detecting a target parking position by using two reference points according to an embodiment of the present invention.

Hereinafter, exemplary embodiments of the present invention will be described in detail with reference to the accompanying drawings. First, in assigning reference numerals to configuration elements in each of the drawings, it should be noted that the same configuration elements will be designated by the same reference numerals all throughout the following description and drawings although they are shown in different drawings. Also, in the following description of the present invention, a detailed description of known functions and configurations incorporated herein will be omitted when it may make the subject matter of the present invention rather unclear.

FIG. 1 is a block diagram illustrating a brief configuration of a parking assist system using an apparatus for detecting a target parking position by using two reference points according to an embodiment of the present invention.

A parking assist system 100 using an apparatus for detecting a target parking position by using two reference points according to an embodiment of the present invention includes a camera 110, a user interface unit 120, a target parking position detection unit 130, a parking assist control unit 140, a sensing unit 150, an active steering unit 160, and an active braking unit 170.

The camera 110 is a photographing means mounted on a vehicle. The camera 110 is mounted in various positions (e.g. the front, rear, sides, etc.) of the vehicle, photographs a parking space to generate an input image, and provides the generated input image to the user interface unit 120, the target parking position detection unit 130, and the parking assist control unit 140, etc. To this end, the camera 110 may be implemented by various photographing devices, such as a film camera, a digital camera, a digital camcorder, a Closed Circuit Television (CCTV), etc.

The user interface unit 120 is mounted in the vehicle, and inputs and outputs data or commands as an input/output means. The user interface unit 120 is mounted around a driver's seat or a front seat in a room of the vehicle, receives as input data or a command from the driver and provides the received data or command to the target parking position detection unit 130, the parking assist control unit 140, etc., and receives data from the camera 110, the target parking position detection unit 130, the parking assist control unit 140, etc. and provides the received data.

Also, the user interface unit 120 receives the input image from the camera 110 and outputs the received input image, so that the user interface unit 120 receives as input two reference points in the input image from the driver and provides the two reference points to the target parking position detection unit 130. To this end, the user interface unit 120 may be implemented by various input/output devices, such as a Liquid Crystal Display (LCD), a touch pad, a keyboard, a mouse, a touch-screen, etc.

The target parking position detection unit 130 is a data processing means for performing data communication and carrying out an operation. When receiving the input image from the camera 110 and the two reference points in the input image from the user interface unit 120, the target parking position detection unit 130 detects a target parking position by using the two reference points, and provides the detected target parking position.

To this end, the target parking position detection unit 130 includes an initial direction setting unit 132, a target pattern detection unit 134, and a target parking position calculation unit 136. Herein, when receiving the input image from the camera 110 and the two reference points in the input image from the user interface unit 120, the initial direction setting unit 132 determines an initial direction of the target parking position by using the two reference points. The target pattern detection unit 134 detects a target pattern of parking slot markings by using each of the two reference points. The target parking position calculation unit 136 detects the target parking position by using the detected target patterns, and provides the detected target parking position.

Also, the target parking position detection unit 130 can detect the target pattern of the parking slot markings by using each of the two reference points, detect the target parking position by using the detected target pattern, and detect the target pattern in an image of a part having a predetermined distance from each of the two reference points in the input image.

Also, the target parking position detection unit 130 can detect a different target pattern, depending on each parking slot marking pattern. When a pattern of the parking slot markings is rectangular, the target parking position detection unit 130 can detect a T-shaped target pattern. In contrast, when a pattern of the parking slot markings is 11-shaped, it can detect a Π-shaped target pattern.

In the former case, the target parking position detection unit 130 converts an image of a part having a predetermined distance from each of the two reference points into a bird's-eye view image, and generates a rectified image. Then, the target parking position detection unit 130 clusters the rectified image into multiple clusters according to brightness, and detects the brightest cluster as the parking slot markings. Then, the target parking position detection unit 130 extracts a skeleton of the detected parking slot markings and performs a distance transform on the extracted skeleton, and calculates a position and an orientation of a target pattern template. Next, the target parking position detection unit 130 detects a target pattern by minimizing errors of the calculated position and orientation.

In the latter case, the target parking position detection unit 130 converts an image of a part having a predetermined distance from each of the two reference points into a bird's-eye view image, and generates a rectified image. Then, the target parking position detection unit 130 clusters the rectified image into multiple clusters according to brightness, and detects the brightest cluster as the parking slot markings. Then, the target parking position detection unit 130 extracts an outer edge of the detected parking slot markings, performs a distance transform on the extracted outer edge, and calculates a position, an orientation, and a marking width of a target pattern template. Next, the target parking position detection unit 130 detects a target pattern by minimizing errors of the calculated position, orientation, and marking width.

Also, the target parking position detection unit 130 detects, as the target parking position, a quadrangle which has, as a side, a straight line with both the same length as the distance between the two target patterns and the same length as the width of the vehicle on a straight line connecting one target pattern to the other, and which has the same side as the length of the vehicle.

In this case, the target parking position detection unit 130, and the initial direction setting unit 132, the target pattern detection unit 134 and the target parking position calculation unit 136 in the target parking position detection unit 130 may be implemented as an independent device which includes a memory for storing a program for performing a function corresponding to each unit, a microprocessor for executing a program stored in the memory, etc. However, they may be implemented as software modules operating on hardware (e.g. a memory and a microprocessor) included in the parking assist system 100.

The parking assist control unit 140 receives the information on the driving situation of the vehicle from the sensing unit 150 and estimates a position of the vehicle based on the received information, receives the target parking position from the target parking position detection unit 130 and generates both path planning and a control signal for parking the vehicle in the target parking position, and provides the generated path planning and control signal to the active steering unit 160 and the active braking unit 170.

Also, the parking assist control unit 140 provides the generated path planning to the user interface unit 120, and controls the user interface unit 120 to output the generated path planning. Then, the parking assist control unit 140 photographs the process of parking the vehicle in the target parking position by using the camera 110. At this time, the parking assist control unit 140 can provide a photographed image to the user interface unit 120, and control the user interface unit 120 to output the photographed image.

To this end, the parking assist control unit 140 includes a path planning generation unit 142, a path tracking control unit 144, and a position estimation unit 146. Herein, the path planning generation unit 142 sets a path planning for parking by using the target parking position provided by the target parking position detection unit 130. The path tracking control unit 144 generates a control signal for parking the vehicle in the target parking position by considering the position and the driving situation of the vehicle and tracking the set path planning, and provides the generated control signal to the active steering unit 160 and the active braking unit 170. The position estimation unit 146 estimates the position of the vehicle by using the driving situation information provided by the sensing unit 150.

In this case, the parking assist control unit 140, and the path planning generation unit 142, the path tracking control unit 144 and the position estimation unit 146 in the parking assist control unit 140 may be implemented as an independent device which includes a memory for storing a program for performing a function corresponding to each unit, a microprocessor for executing a program stored in the memory, etc.

However, they may be implemented as software modules operating on hardware (e.g. a memory and a microprocessor) included in the parking assist system 100.

The sensing unit 150 includes multiple sensors, such as a vehicle wheel speed sensor, a steering angle sensor, a yaw rate sensor, an acceleration sensor, etc., and senses a driving situation of the vehicle. At this time, the sensing unit 150 generates a sensing signal, which refers to an electrical signal corresponding to sensing of the driving situation of the vehicle, as the information on the driving situation of the vehicle, and provides the generated driving situation information to the position estimation unit 146 of the parking assist control unit 140.

The active steering unit 160 is a steering assist device which guides steering in order to be able to obtain safety of steering by using various sensors and control devices in response to a driver's steering input. Accordingly, the active steering unit 160 steers the vehicle in response to the control signal provided by the parking assist control unit 140.

To this end, it is possible to conceptualize that the active steering unit 160 may include an Electronic Power Steering (EPS), a Motor Driven Power Steering (MDPS), an Active Front Steering (AFS), etc. However, the present invention is not necessarily limited to this conceptualization.

The active braking unit 170 is a braking device for limiting a moving speed of the vehicle, and brakes the vehicle by changing a braking state of the vehicle in response to the control signal provided by the parking assist control unit 140.

To this end, it is possible to conceptualize that the active braking unit 170 may include an Anti-lock Brake System (ABS), an Electronic Stability Control system (ESC), etc. However, the present invention is not necessarily limited to this conceptualization.

Figure 2:
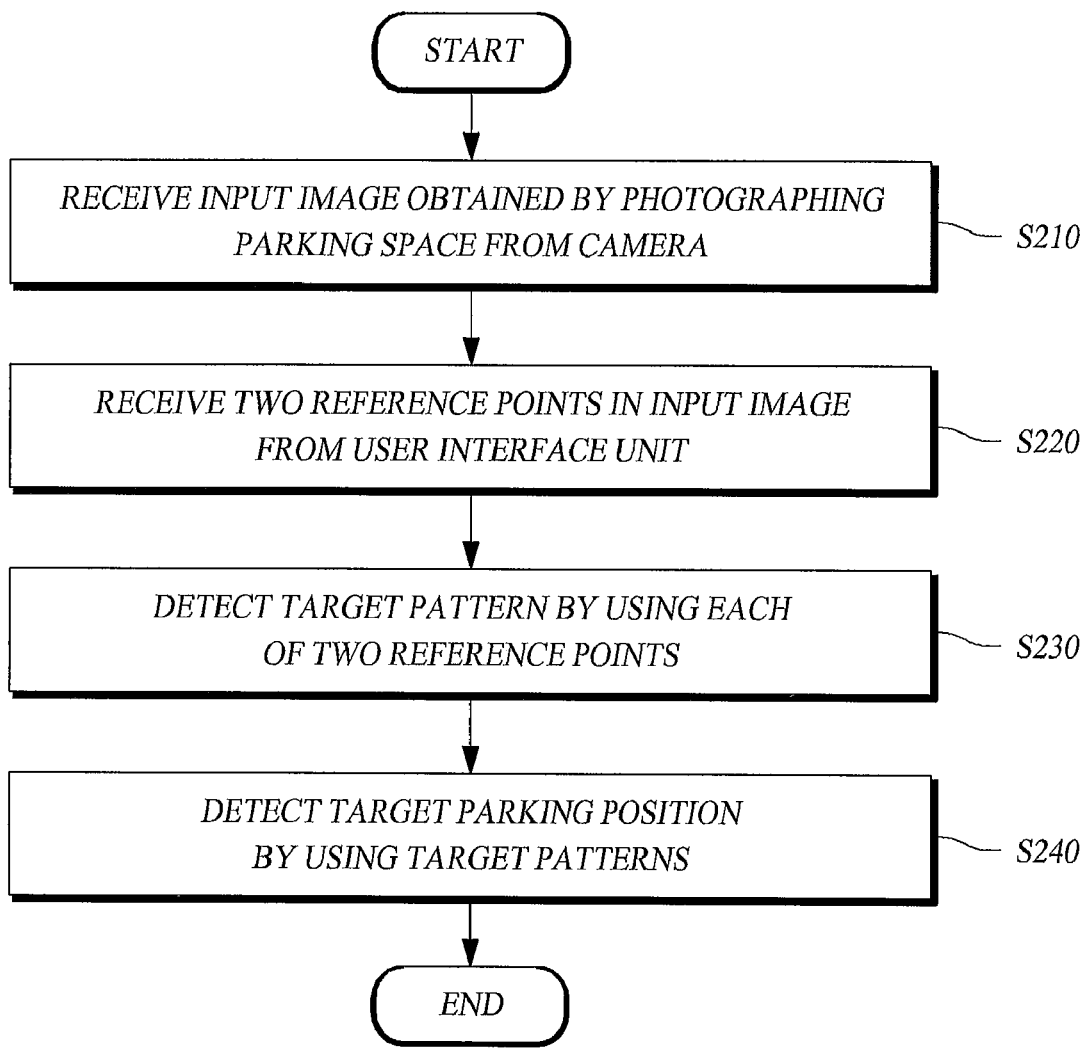
FIG. 2 is a flowchart showing a method for detecting a target parking position by using two reference points according to an embodiment of the present invention.

FIG. 2 is a flowchart showing a method for detecting a target parking position by using two reference points according to an embodiment of the present invention.

The method for detecting a target parking position by using the two reference points according to an embodiment of the present invention includes steps S210, S220, S230, and S240. In step S210, the target parking position detection unit 130 or the apparatus for detecting a target parking position receives an input image obtained by photographing a parking space from the camera 110. In step S220, the target parking position detection unit 130 or the apparatus for detecting a target parking position receives the two reference points in the input image from the user interface 120. In step S230, the target parking position detection unit 130 or the apparatus for detecting a target parking position detects the target pattern of the parking slot markings by using each of the two reference points. In step S240, the target parking position detection unit 130 or the apparatus for detecting a target parking position detects the target parking position by using the two detected target patterns, and provides the detected target parking position.

Figure 3:
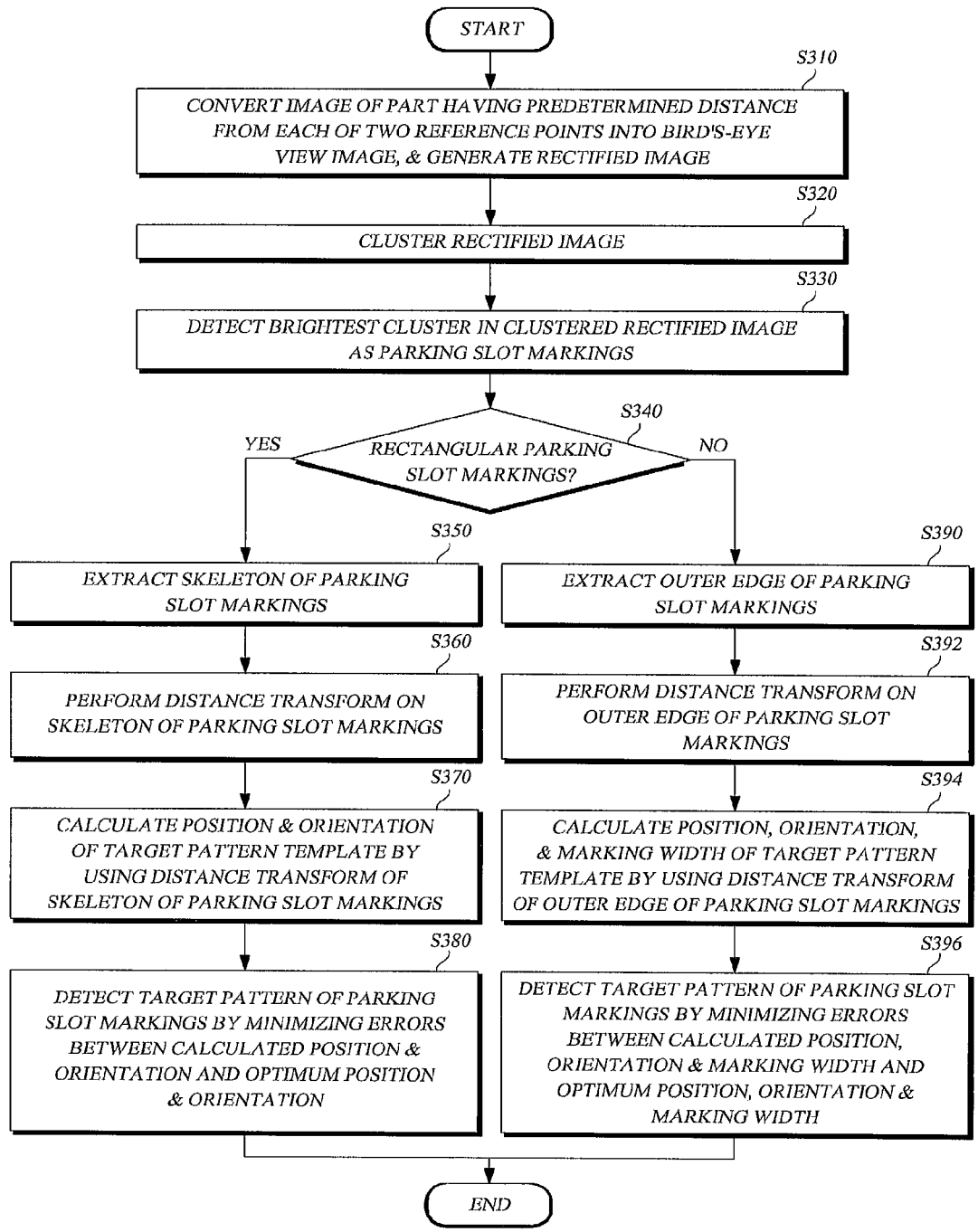
FIG. 3 is a flowchart showing a method for detecting a target pattern by using each of two reference points according to an embodiment of the present invention.

FIG. 3 is a flowchart showing a method for detecting a target pattern by using each of the two reference points according to an embodiment of the present invention.

In the method for detecting a target parking position by using the two reference points according to an embodiment of the present invention, as shown in FIG. 2, the process of detecting a target pattern by using each of the two reference points as described in step S230 can be divided into sub-steps as follows.

Namely, the target parking position detection unit 130 or the apparatus for detecting a target parking position receives the two reference points in the input image in step S220. Then, the target parking position detection unit 130 or the apparatus for detecting a target parking position converts an image of a part having a predetermined distance from each of the two reference points into a bird's-eye view image, and generates a rectified image (S310). Then, the target parking position detection unit 130 or the apparatus for detecting a target parking position clusters the rectified image into multiple clusters according to brightness (S320). Then, the target parking position detection unit 130 or the apparatus for detecting a target parking position detects the brightest cluster in the clustered rectified image as the parking slot markings (S330).

At this time, the target parking position detection unit 130 checks if a pattern of the parking slot markings is rectangular (S340). When the pattern of the parking slot markings is rectangular, the target parking position detection unit 130 extracts a skeleton of the detected parking slot markings (S350), and performs a distance transform on the extracted skeleton (S360). Then, the target parking position detection unit 130 calculates a position and an orientation of a target pattern template by using the distance transform of the extracted skeleton (S370). Next, the target parking position detection unit 130 detects the target pattern by minimizing errors of the calculated position and orientation (S380).

On the other hand, when it is determined in step S340 that a pattern of the parking slot markings is not rectangular (e.g. when the pattern of the parking slot markings is 11-shaped), the target parking position detection unit 130 extracts an outer edge of the parking slot markings (S390), and performs a distance transform on the extracted outer edge of the parking slot markings (S392). Then, the target parking position detection unit 130 calculates a position, an orientation and a marking width of a target pattern template by using the distance transform of the extracted outer edge (S394). Next, the target parking position detection unit 130 detects the target pattern by minimizing errors of the calculated position, orientation and marking width (S396).

In this case, although the 11-shaped pattern is exemplified when a pattern of the parking slot markings is not rectangular, examples of 11-shapes as described above may include not only an "11"-shape, which stands upright, but also another "11"-shape, such as "11" and a similar shape, which is obliquely inclined to the left or right.

Embodiment

The apparatus for detecting a target parking position by using the two reference points according to an embodiment of the present invention uses a scheme in which the driver provides a hint for detecting the target parking position by using a touch-screen mounted in the vehicle.

Hereinafter, a description will be made of a case where the pattern of the parking slot markings is rectangular or 11-shaped. However, the idea of the art in the present invention is not necessarily applied to only the parking slot markings with these patterns. Even when the vehicle is parked in a parking lot whose parking slot markings have a pattern similar to any of the patterns as described above, the idea of the art in the present invention may be applied to the detection of a target parking position.

Figure 4:
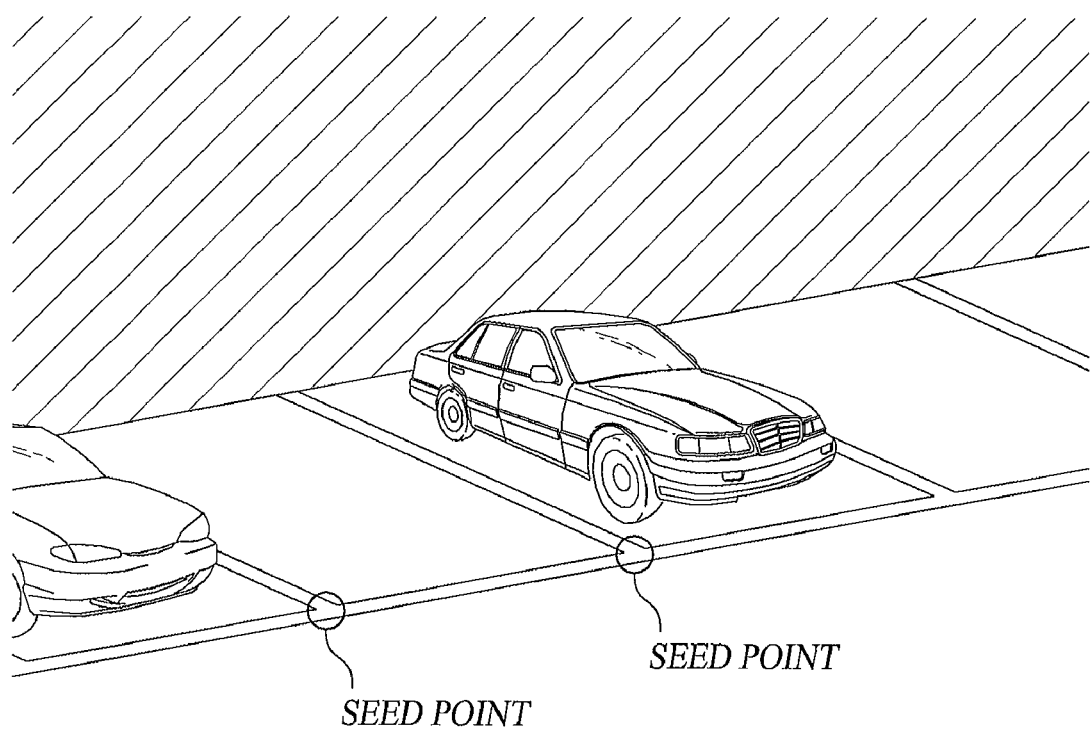
FIG. 4 is an illustrative view showing two reference points (or seed points) which are input in an input image.

FIG. 4 is an illustrative view showing two reference points which are input in an input image.

Parking can be initiated when a driver changes the position of the gear to reverse. When the camera 110 mounted on the rear of the vehicle provides an input image obtained thereby to the user interface unit 120, the driver indicates, through a touch-pad, etc., end parts of separation lines on both sides of parking slot markings, at which he/she desires to park, in the input image. At this time, two reference points indicated by the driver are input. When the input reference points are used, it is possible to limit a direction of the target parking position, which is intended to be detected, to a small zone.

Fish-eye lens correction and bird's-eye view image conversion are performed on a nearby image of each reference point, and a search is then made for a target pattern, which refers to a particular pattern determined according to each parking slot marking pattern. When a pattern of the parking slot markings is rectangular, a search is made for a T-shaped target pattern which refers to a pattern formed by met line segments of the parking slot markings. In contrast, when a pattern of the parking slot markings is 11-shaped, a search is made for a Π-shaped target pattern which refers to a pattern of an outer edge at the end of each of separation lines on both sides of the parking slot markings.

The search for the target pattern may be implemented by template matching with a particular pattern of a skeleton or an outer edge of a line segment of the parking slot markings. Particularly, if it is premised that a target pattern exists, the search for the target pattern is the same as an optimization problem of finding parameters representing a center point and an angle that minimize a matching error of a target pattern template.

If two target patterns are found, it means that entrance coordinates of the target parking position are checked. Therefore, the target parking position can be detected, and path planning for parking control can be executed.

Hereinafter, a process for detecting a target parking position according to the present invention will be described by using numbers. However, the description of the process by using numbers is only for the convenience of the description, and therefore the present invention is not limited to the order of the numbers.

Figure 5:
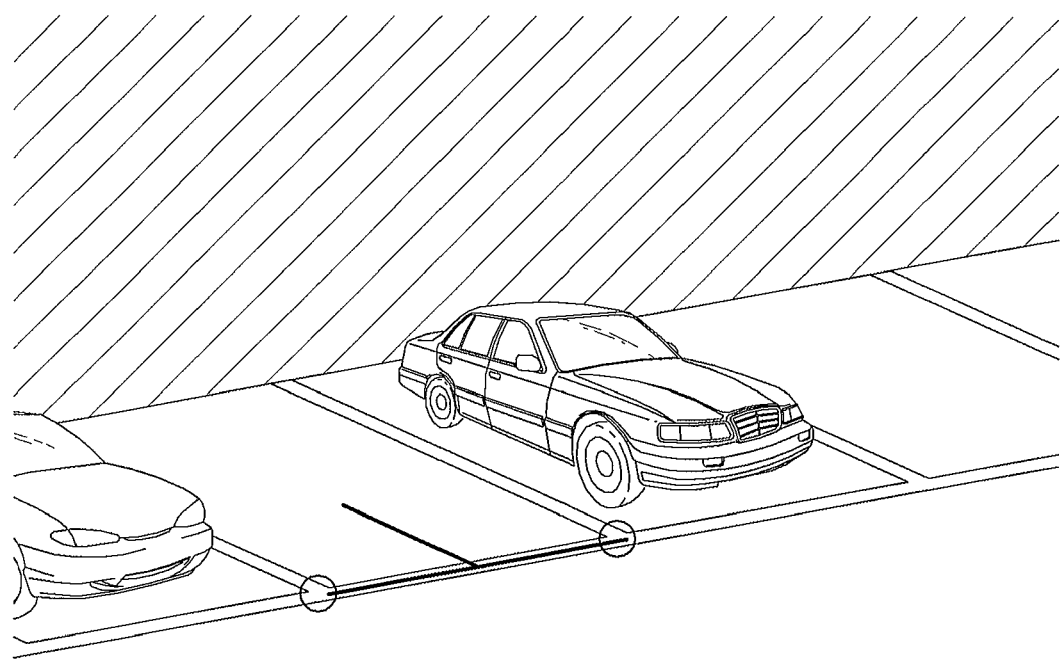
FIG. 5 is an illustrative view showing a straight line making a connection between two reference points and an initial direction of a target parking position.

1. Setting Initial Direction of Target Parking Position by Using Reference Points FIG. 5 is an illustrative view showing a straight line making a connection between two reference points and an initial direction of a target parking position.

The two reference points input by the driver nearly coincide with an entrance of the target parking position. Accordingly, an initial direction of the target parking position can be determined as a direction which is perpendicular to a straight line between the two reference points and becomes more distant from the camera 110.

2. Defining Target Pattern According to Each Parking Slot Marking Pattern

Figure 6:
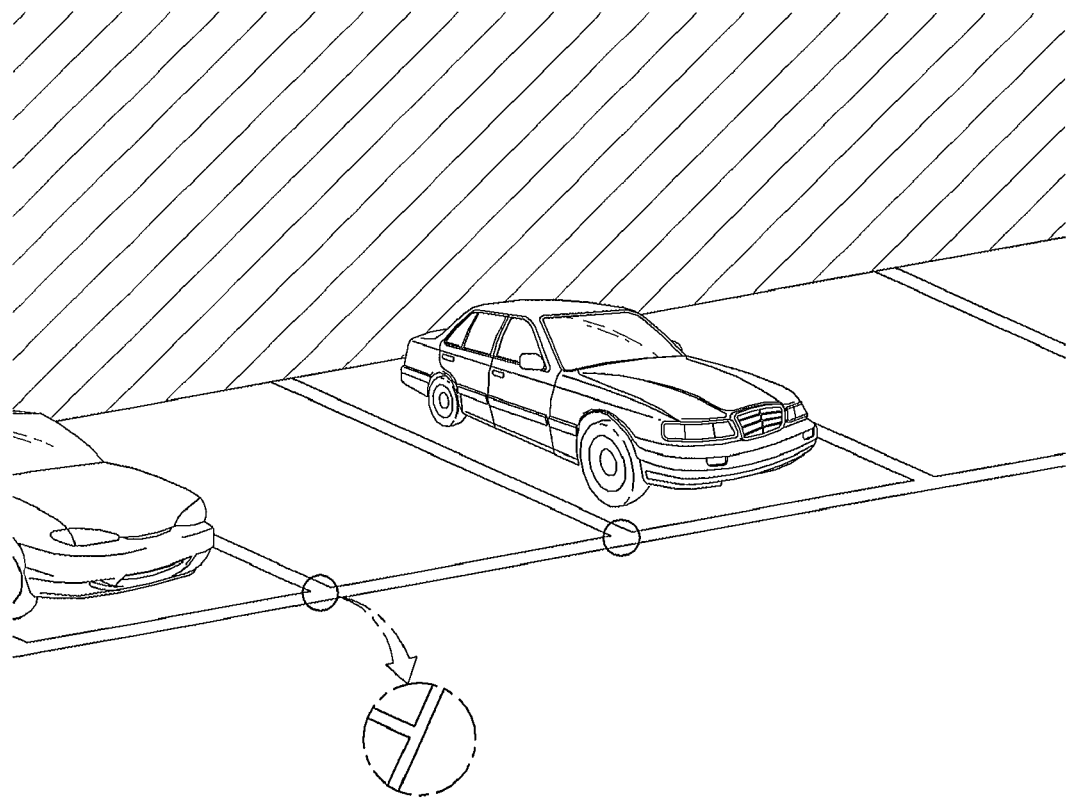
FIG. 6 is an illustrative view showing a rectified image of rectangular parking slot markings.
Figure 7:
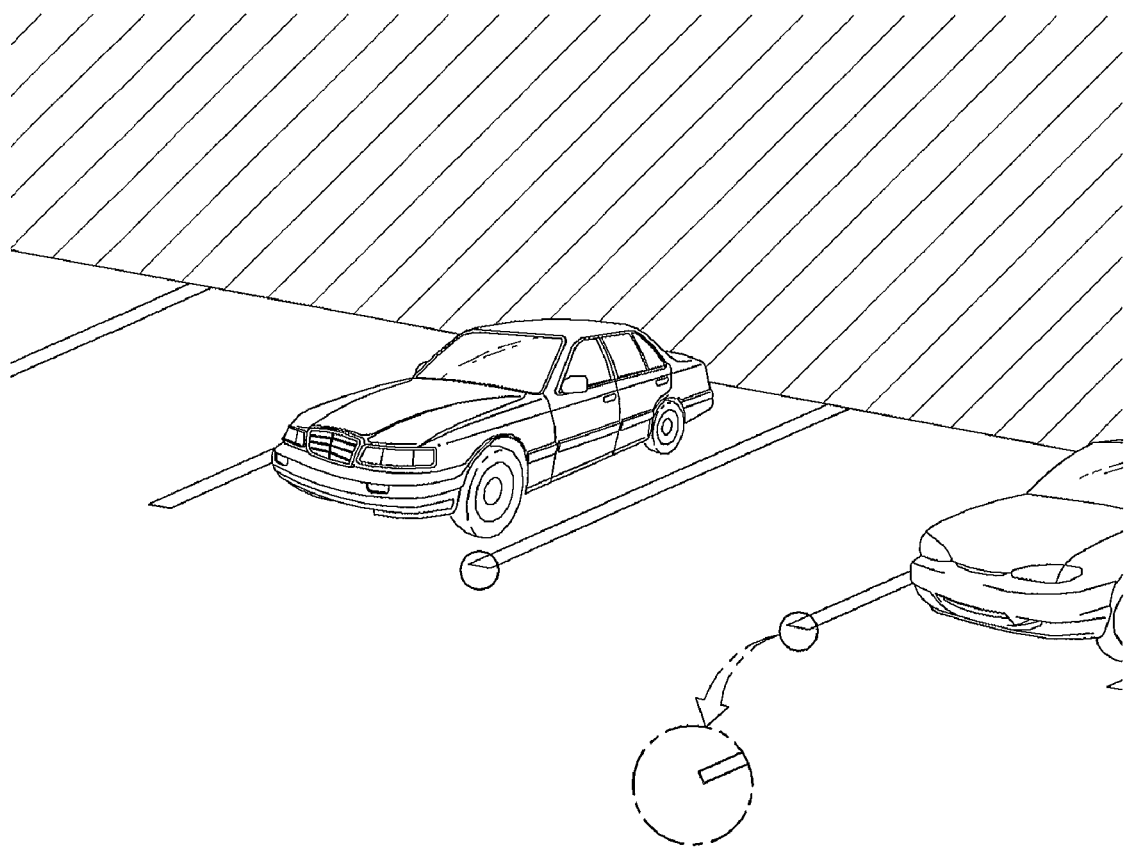
FIG. 7 is an illustrative view showing a rectified image of 11-shaped parking slot markings.

If the initial direction of the target parking position is determined, a search is made near each reference point for a target pattern which is a particular pattern corresponding to the end of a separation line of the parking slot markings. Fish-eye lens correction and the generation of a bird's-eye view image are applied to a predetermined part of an image adjacent to each reference point, so that a rectified image is obtained as shown in FIGS. 6 and 7. Each reference point corresponds to the end of a separation line of the parking slot markings which has been indicated by the driver. Accordingly, it can be assumed that each reference point is a point on the earth's surface.

As a result, the bird's-eye view image can be generated by using homography between an image obtained by the camera 110 mounted on the rear of the vehicle and the earth's surface. At this time, the bird's-eye view image is generated on only a predetermined small region with a width of 1 meter and a length of 1 meter around each reference point, and interpolation is not performed. Accordingly, small memory capacity and amount of calculations are necessary to determine the target parking position.

FIG. 6 is an illustrative view showing a rectified image of rectangular parking slot markings.

In FIG. 6, a line segment, which separates a parking lot from the road, meets a line segment which separates one parking slot from another. Accordingly, it can be recognized that there is a T-shape formed by center-lines of the met line segments.

FIG. 7 is an illustrative view showing a rectified image of 11-shaped parking slot markings.

When only a center-line of a line segment is used as in the case of the rectangular parking slot markings as described above referring to FIG. 6, a position in a longitudinal direction becomes incorrect. Accordingly, a Π-shaped of an outer edge of a line segment is used as the target pattern in the case of the 11-shaped parking slot markings.

3. Distance Transform-Based Target Pattern Detection

Target pattern detection determines a position and an orientation of a target pattern on the assumption that one target pattern exists in a rectified image. The target pattern detection searches an intensity histogram for a predetermined number of clusters, and determines the brightest cluster as parking slot markings. The simple separation of the parking slot markings as described above is robust against an external interference factor, such as a pattern of a flat surface of asphalt, etc., but much noise is included in a boundary line of the parking slot markings.

Due to the much noise as described above, a syntactic pattern recognition method has difficulty in recognizing the parking slot markings. Accordingly, a method is used for minimizing an error between a distance transform of a skeleton or an outer edge of the parking slot markings and a target pattern template in a Genetic Algorithm (GA).

3-1. T-Shaped Target Pattern: Rectangular Parking Slot Markings

FIGS. 8A, 8B, 8C, and 8D are illustrative views showing a process for detecting a T-shaped target pattern.

Figure 8:
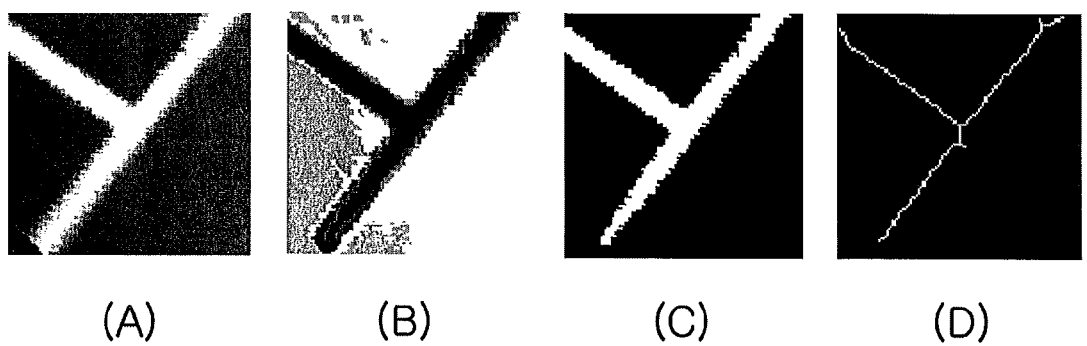
FIGS. 8A, 8B, 8C, and 8D are illustrative views showing a process for detecting a T-shaped target pattern.

FIG. 8A shows a rectified image. FIG. 8B shows an image obtained by clustering the rectified image into multiple clusters. FIG. 8C shows an image obtained by recognizing parking slot markings. FIG. 8D shows an image representing a skeleton of the recognized parking slot markings.

Since the parking slot markings are usually painted in a bright color on a dark flat surface, they can be divided into two different colored clusters. However, according to the present invention, the parking slot markings are over-clustered into four clusters in consideration of the effects of a shadow, an asphalt pattern, etc. around a vehicle. Then, the brightest cluster from among the four clusters is determined as parking slot markings.

Due to the over-clustering, an outer edge of the parking slot markings includes much noise in the present invention. However, the over-clustering makes it possible to group only points which definitely represent the parking slot markings. In the case of the T-shaped target pattern, it is possible to find a skeleton of the parking slot markings by carrying out a binary morphological operation on the parking slot markings.

FIGS. 9A and 9B are illustrative views showing a result of a distance transform on a skeleton of parking slot markings.

FIG. 9A shows an image obtained by performing a distance transform on the skeleton of the parking slot markings. FIG. 9B shows a distance vs. pixel graph representing a result of a distance transform on the skeleton of the parking slot markings.

Figure 9:
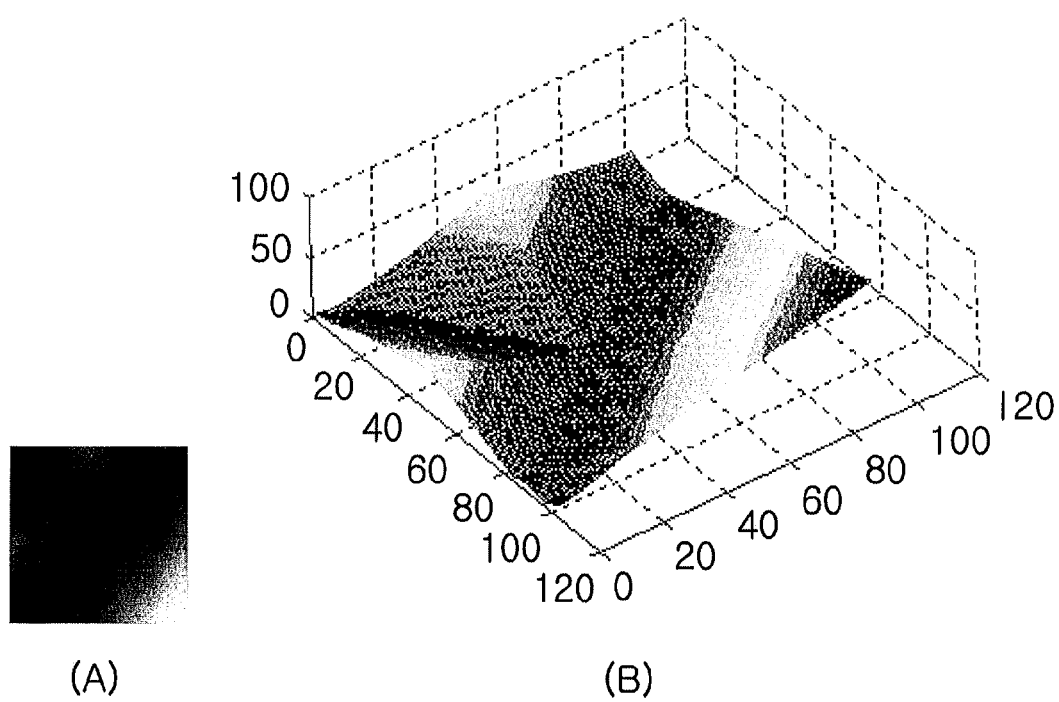
FIGS. 9A and 9B are illustrative views showing a result of a distance transform on a skeleton of parking slot markings.

When the skeleton of the parking slot markings is obtained, it is possible to perform a distance transform on the skeleton of the parking slot markings, as shown in FIG. 9. Target pattern detection is to find an optimum position and orientation of a target pattern template.

Figure 10:
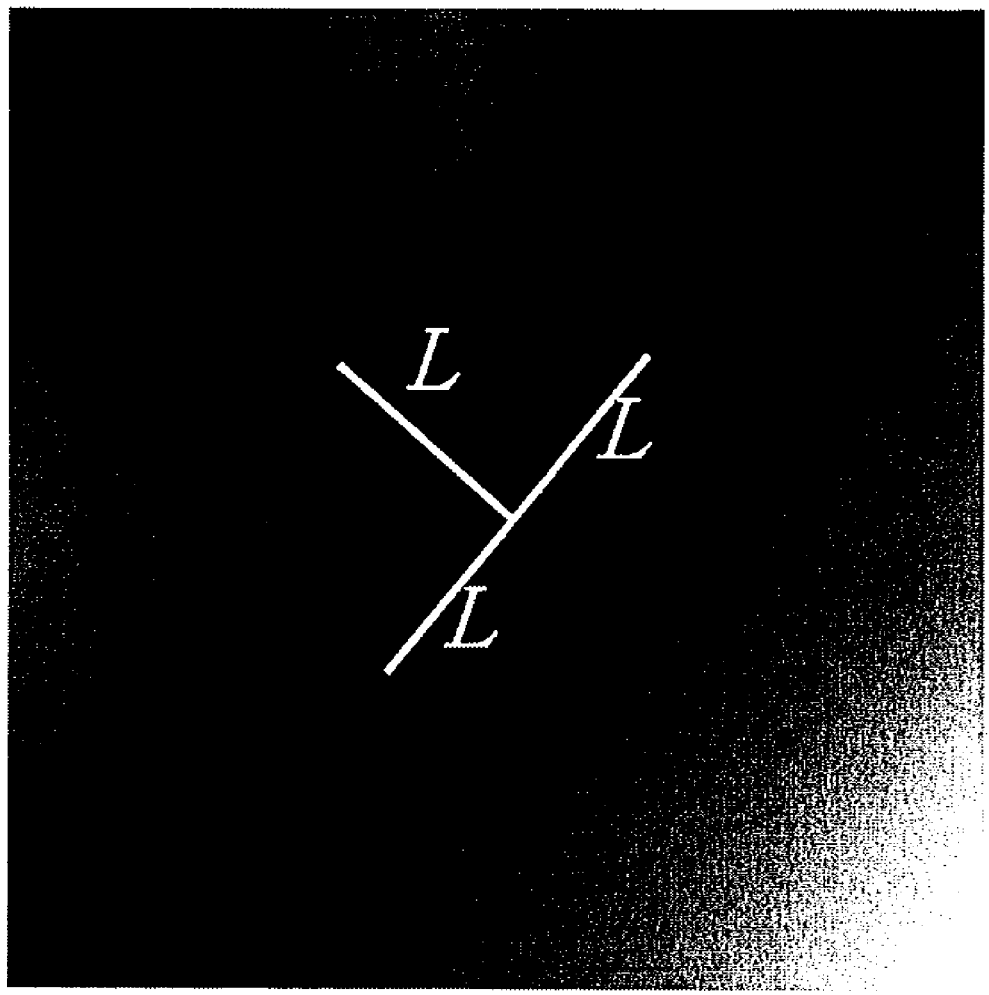
FIG. 10 is an illustrative view showing a target pattern template of the rectangular parking slot markings.

FIG. 10 is an illustrative view showing a target pattern template of the rectangular parking slot markings.

In the case of the rectangular parking slot markings, the target pattern template includes three straight lines, each of which has a length of L, as shown in FIG. 10. Herein, setting the target pattern template is based on an optional assumption. Accordingly, when the target pattern template is located on the distance transform result according to the assumption as shown in FIG. 10, errors of a position and an orientation of the target pattern template can be defined as the sum of distance values at positions at regular intervals on the target pattern template.

The target pattern detection is to minimize an error of an arrangement P(x, y, and θ) of the target pattern template. According to the present invention, the GA is used to find a solution. Namely, a gene of the GA includes the three parameters x, y, and θ of the arrangement P. Also, a fitness function uses an error defined by using the distance transform of the skeleton of the parking slot markings. At this time, an orientation θ is restricted so as to be close to an initial orientation of a target parking position.

Also, an intersection point of a T-shaped target pattern template is initialized to become an intersection point of the skeleton of the parking slot markings, so that search efficiency can be raised.

Figure 11:
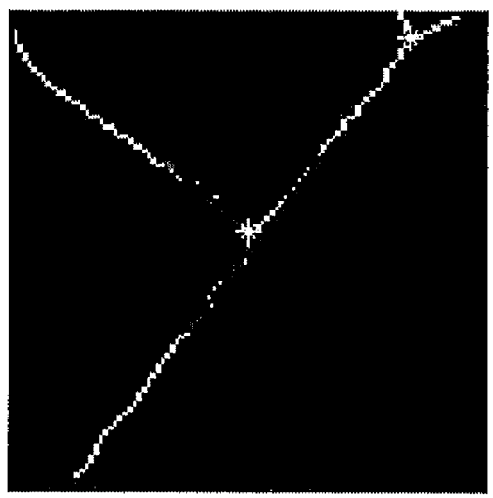
FIGS. 11A and 11B are illustrative views showing an intersection point and an optimum arrangement of the skeleton of the parking slot markings.
Figure 11:
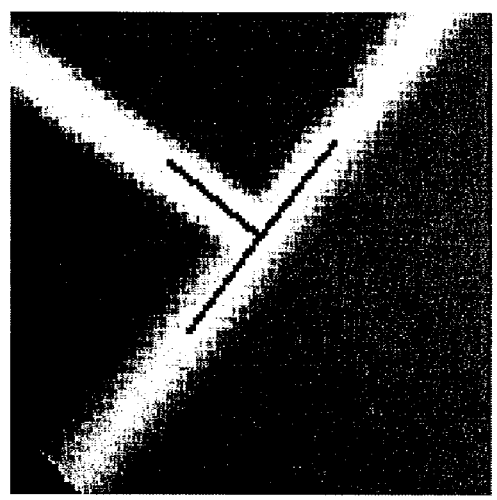

FIGS. 11A and 11B are illustrative views showing an intersection point and an optimum arrangement of the skeleton of the parking slot markings.

The GA can carry out operations on 200 populations over 100 generations.

FIG. 11A shows an intersection point of the skeleton of the parking slot markings. FIG. 11B shows the optimum arrangement of the target pattern template obtained by performing the GA.

Figure 12:
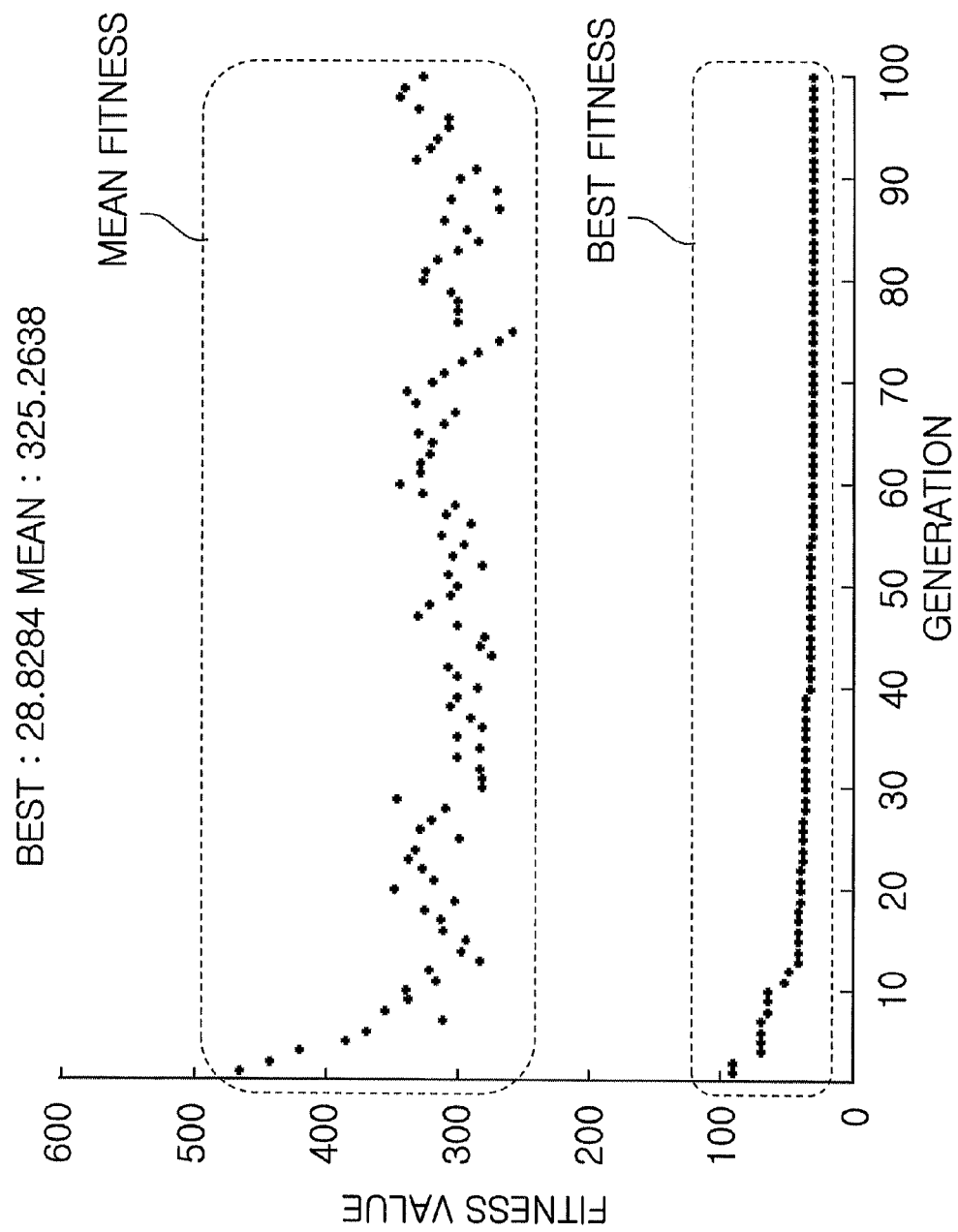
FIG. 12 is a graph showing mean/best fitness function values of a Genetic Algorithm (GA)

FIG. 12 is a graph showing mean/best fitness function values of the GA.

When the GA is performed, a mean fitness function value and a best fitness function value can be represented as shown in FIG. 12. It can be noted from FIG. 12 that all 100 generations quickly converge to a minimum value at the very beginning.

3-2. Detection of Π-Shaped Target Pattern: 11-Shaped Parking Slot Markings

FIGS. 13A, 13B, 13C, and 13D are illustrative views showing a process for detecting a Π-shaped (or ⊏-shaped) target pattern.

FIG. 13A shows a rectified image. FIG. 13B shows an image obtained by clustering the rectified image into multiple clusters. FIG. 13C shows an image obtained by recognizing parking slot markings. FIG. 13D shows an image representing an outer edge of the parking slot markings.

In the same manner as the detection of the T-shaped target pattern, the detection of the Π-shaped target pattern detects four clusters in an intensity histogram, and determines the brightest cluster as the parking slot markings. In the case of the Π-shaped target pattern, an outer edge of the parking slot markings is extracted by using a binary morphological operation. The target pattern refers to a Π-shaped pattern of an end part of the extracted outer edge.

FIGS. 14A, 14B, 14C, and 14D are illustrative views showing a result of a distance transform on an outer edge of the parking slot markings.

Figure 14:
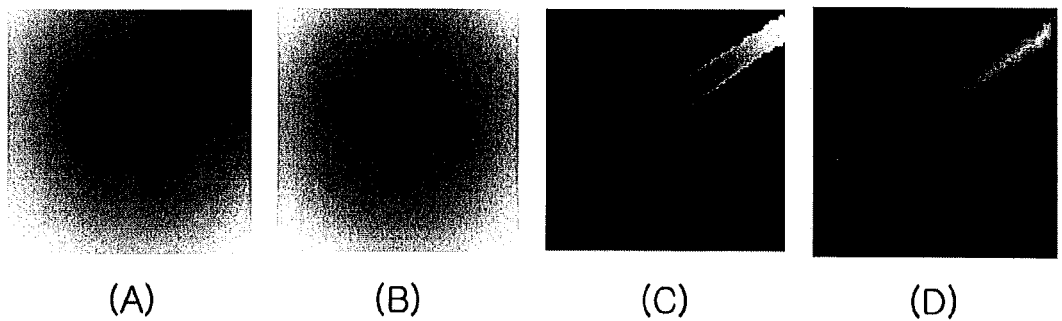
FIGS. 14A, 14B, 14C, and 14D are illustrative views showing a result of a distance transform on an outer edge of the parking slot markings.

FIG. 14A shows an image representing the result of the distance transform on the outer edge of the parking slot markings. FIG. 14B shows an image representing a result of the distance transform on an end point of the parking slot markings. FIG. 14C shows an image representing an inner part of the parking slot markings. FIG. 14D shows an image representing a result of a modified distance transform on the outer edge of the parking slot markings.

Figure 13:
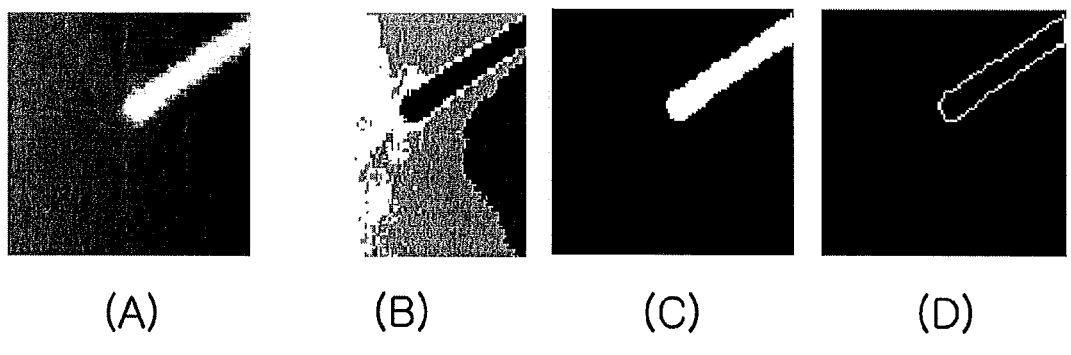
FIGS. 13A, 13B, 13C, and 13D are illustrative views showing a process for detecting a Π-shaped (or ⊏-shaped) target pattern.

When the outer edge of the parking slot markings is extracted as shown in FIG. 13, it is possible to perform the distance transform on the outer edge of the parking slot markings as shown in FIG. 14A. When a distance transform is performed on the Π-shaped target pattern, differently from the case of the T-shaped target pattern, a width of the parking slot markings changes and information on a longitudinal direction is not enough.

In order to overcome the obstacles as described above, in the embodiment, a distance transform is performed on an end point of the parking slot markings as shown in FIG. 14B. Then, an inner part of the parking slot markings as shown in FIG. 14C is multiplied by the result of the distance transform on the outer edge of the parking slot markings as shown in FIG. 14A. Accordingly, a distance transform is performed, as shown in FIG. 14D, for modifying a distance value of an end part of the parking slot markings so that the distance value may become smaller.

Figure 15:
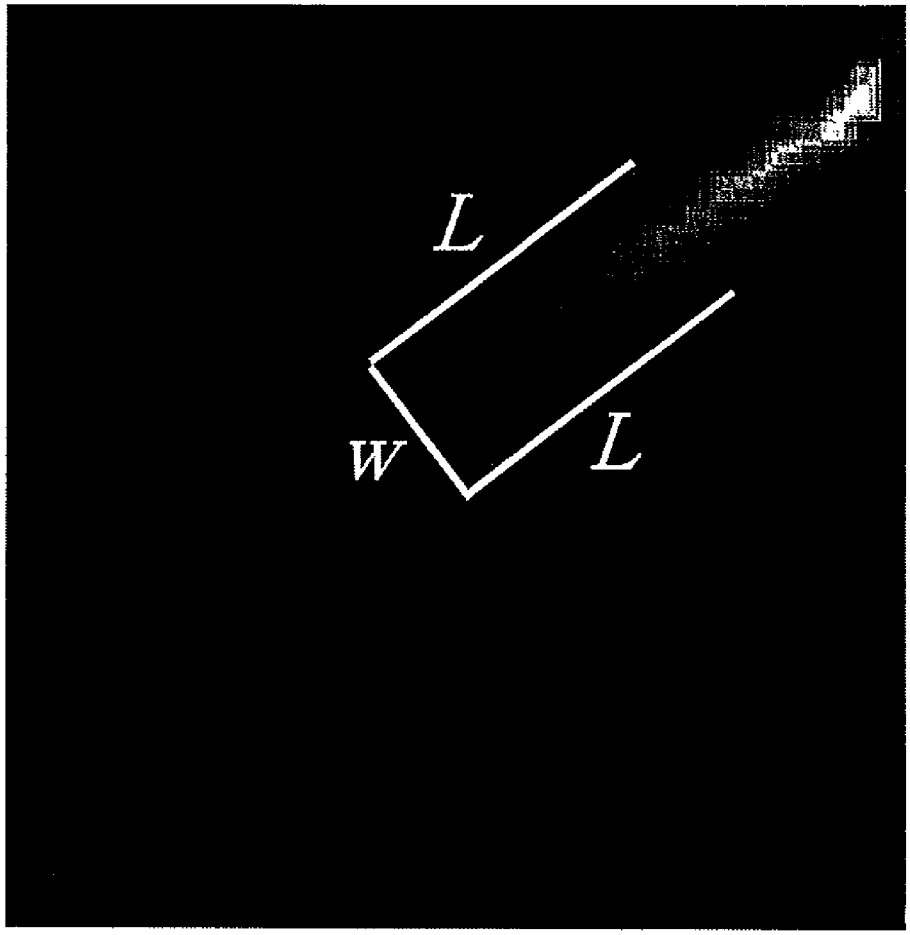
FIG. 15 is an illustrative view showing a target pattern template of the 11-shaped parking slot markings.

FIG. 15 is an illustrative view showing a target pattern template of the 11-shaped parking slot markings.

The detection of the Π-shaped target pattern is to find an optimum position, orientation, and marking width of a target pattern template. Namely, in the case of the 11-shaped parking slot markings, a marking width, which refers to a width of a line segment of the parking slot markings, cannot be known in advance. Therefore, it is assumed as noted in FIG. 15 that a line segment of the parking slot markings includes two line segments which have a width of w between them and each of which has a length of L. When the target pattern template is located on the distance transform result according to an optional assumption as shown in FIG. 15, an error in the optional assumption is defined as the sum of distance values at positions at regular intervals on the target pattern template.

Figure 16:
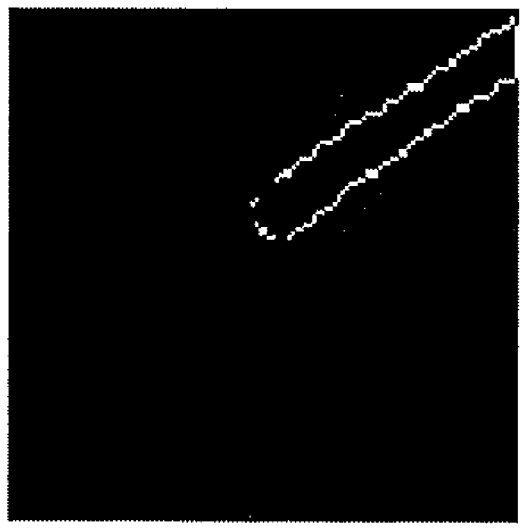
FIGS. 16A and 16B are illustrative views showing a result of detecting the Π-shaped target pattern.
Figure 16:
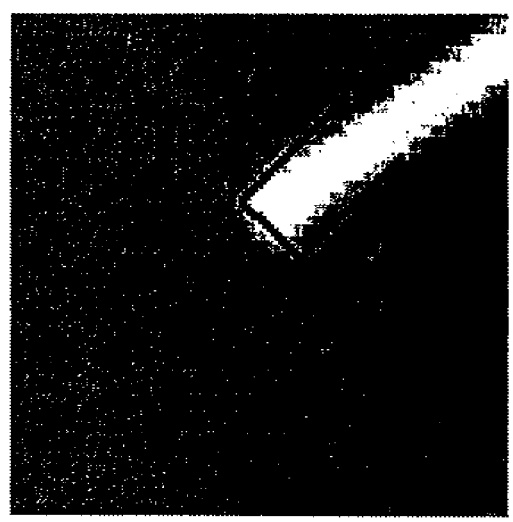

FIGS. 16A and 16B are illustrative views showing a result of detecting the Π-shaped target pattern.

FIG. 16A shows an image representing an outer edge of the 11-shaped parking slot markings. FIG. 16B shows an image representing a result of detecting the Π-shaped target pattern in the rectified image.

The target pattern detection is to minimize errors of an arrangement P(x, y, and θ) and the marking width w of the target pattern template. In the present invention, the GA is used to find a solution in the same manner as the rectangular parking slot markings.

Figure 17:
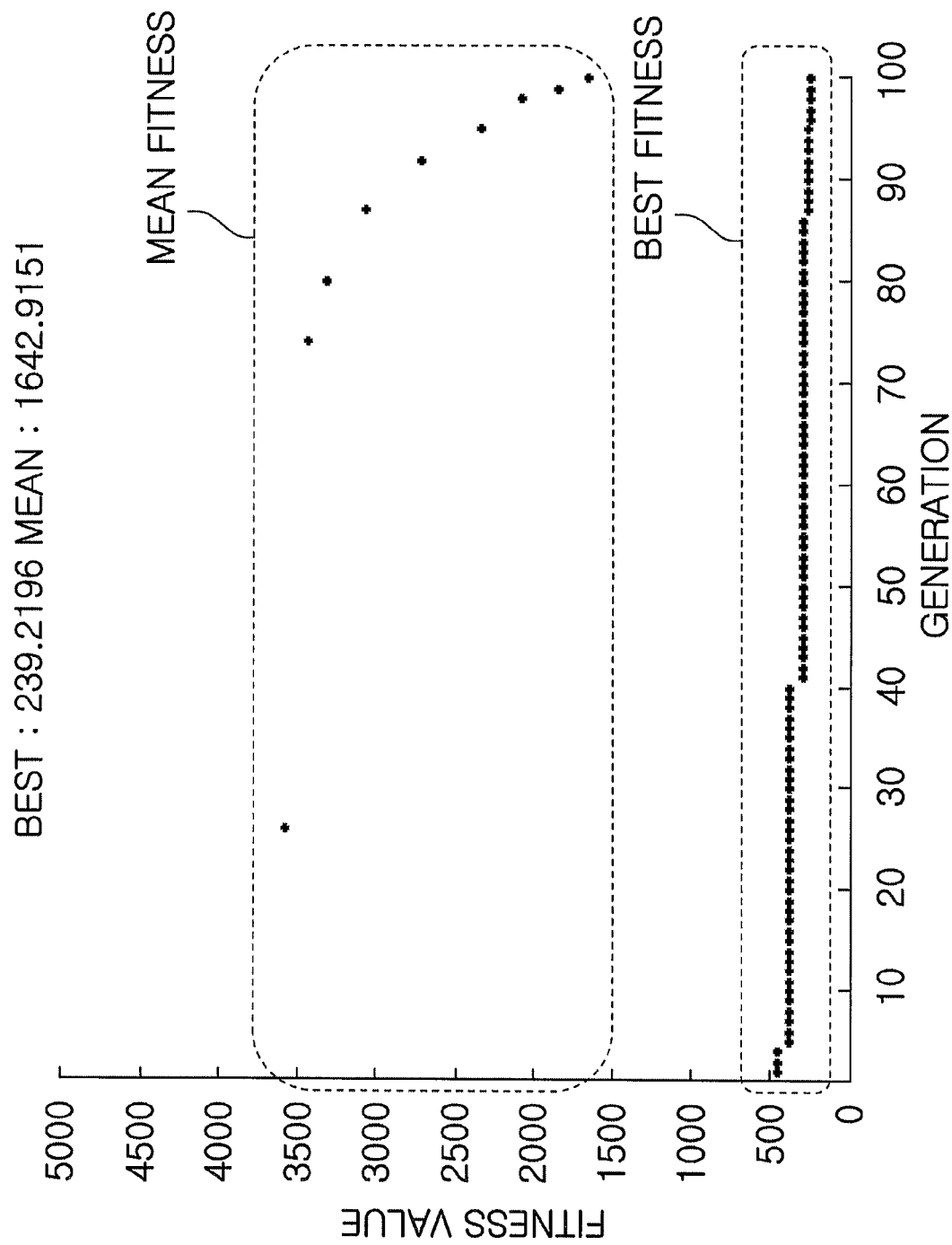
FIG. 17 is a graph showing mean/best fitness function values of a GA.

FIG. 17 is a graph showing mean/best fitness function values of the GA.

When the GA is performed, a mean fitness function value and a best fitness function value can be represented in the graph as shown in FIG. 17. It can be noted from FIG. 17 that all 100 generations quickly converge to a minimum value at the very beginning.

4. Detection of Target Parking Position

As described above, when target patterns of separation lines on both sides of the parking slot markings are recognized, a target parking position can be detected by using the two target patterns.

Figure 18:
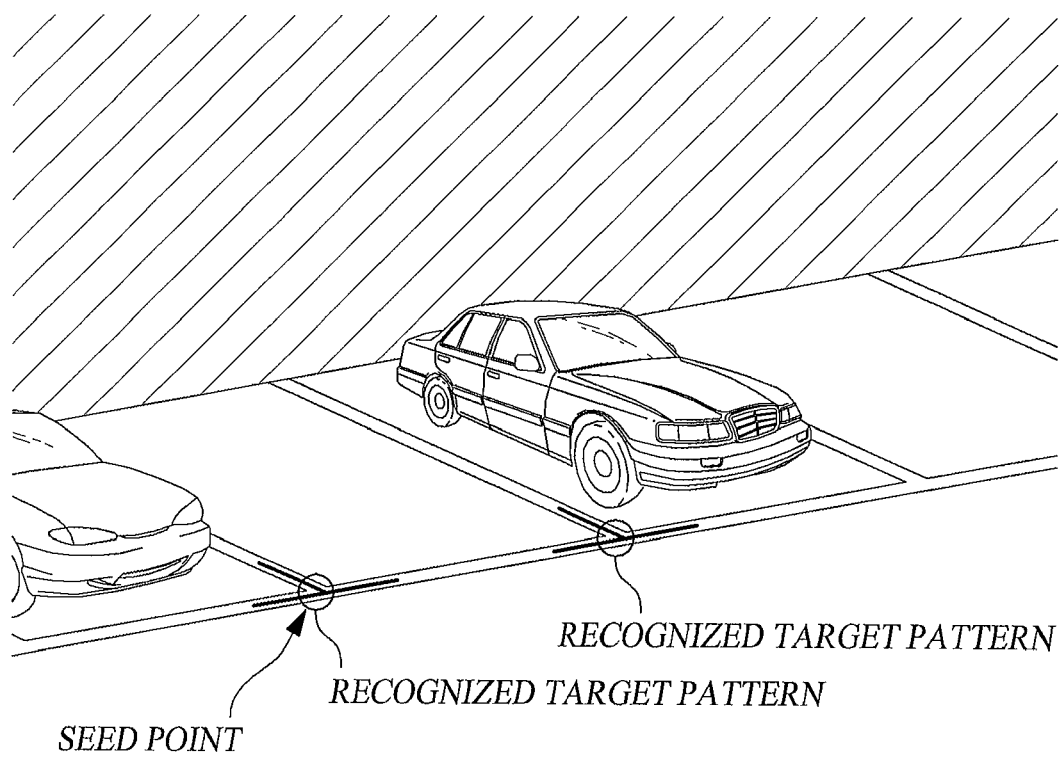
FIG. 18 is an illustrative view showing two reference points and a detected target pattern.

FIG. 18 is an illustrative view showing two reference points and a detected target pattern.

The two reference points, which are input by the driver by using a touch-screen, etc. of the user interface unit 120 mounted in the vehicle, and the target pattern detected near each reference point can be represented as shown in FIG. 18.

The driver inputs the two reference points by using a small-sized touch-screen, etc. At this time, it the driver has difficulty in indicating each reference point accurately at the center of the target pattern.

However, according to the embodiment of the present invention, even when the driver indicates a spot, which is considerably distant from a target pattern, as illustrated in FIG. 18, it is possible to successfully recognize a target pattern. Then, it is possible to accurately detect a target parking position by using the recognized target patterns. Due to these advantages, the method according to the embodiment of the present invention is different from a simple method in which the driver manually sets a target parking position.

Figure 19:
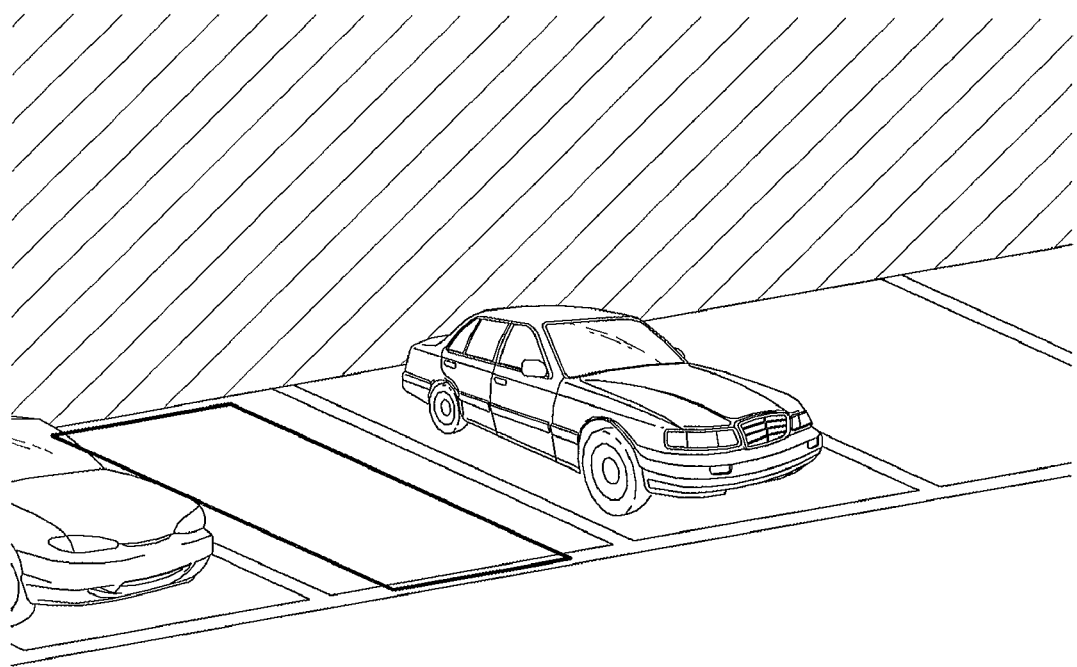
FIG. 19 is an illustrative view showing a result of detecting a target parking position.

FIG. 19 is an illustrative view showing a result of detecting a target parking position.

When a quadrangle is set so that a side of the quadrangle is located on a straight making a connection between the two detected target patterns and the quadrangle may have the same distance from the two target patterns, it is possible to detect the target parking position.

At this time, the width and length of the quadrangle are equal to the width and length of the vehicle, respectively. The position and orientation of each of the two target patterns are not only very accurately detected, but also a direction of the target parking position can be more accurately detected by using the two target patterns located at a predetermined interval on both sides of the parking slot markings.

5. Experimental Results

When the present invention is applied in various examples of parking slot markings of two types (i.e. rectangular parking slot markings and 11-shaped parking slot markings), it is possible to successfully recognize the parking slot markings and detect a target parking position.

Figure 20:
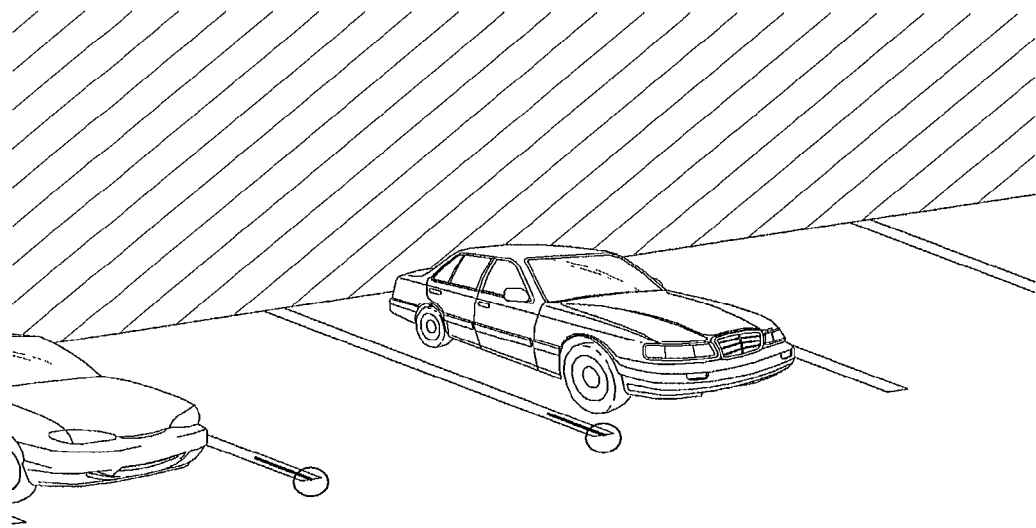
FIGS. 20A and 20B are illustrative views showing a result of detecting a target parking position of the 11-shaped parking slot markings.
Figure 20:
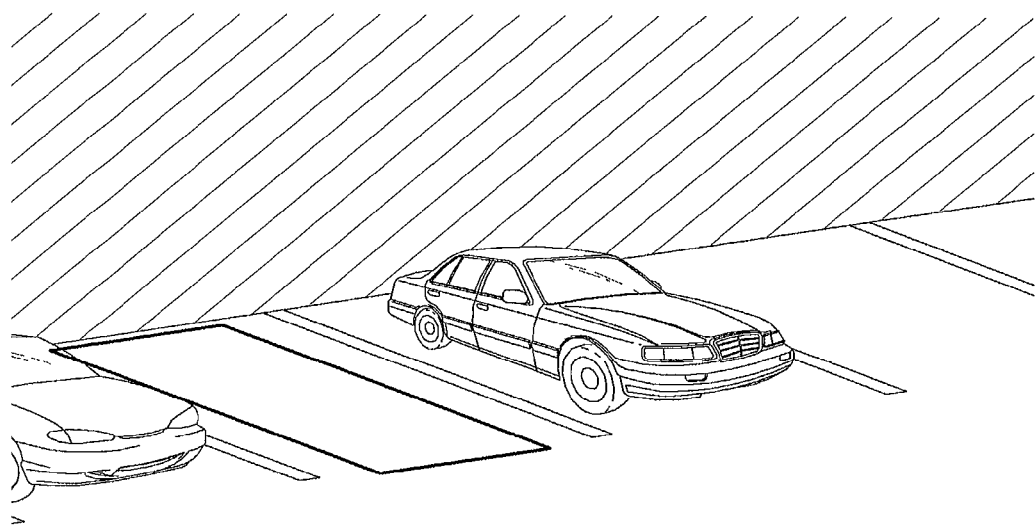

FIGS. 20A and 20B are illustrative views showing a result of detecting a target parking position of the 11-shaped parking slot markings.

FIG. 20A shows a result of detecting a Π-shaped target pattern. FIG. 20B shows a result of detecting a target parking position of the 11-shaped parking slot parking.

Figure 21:
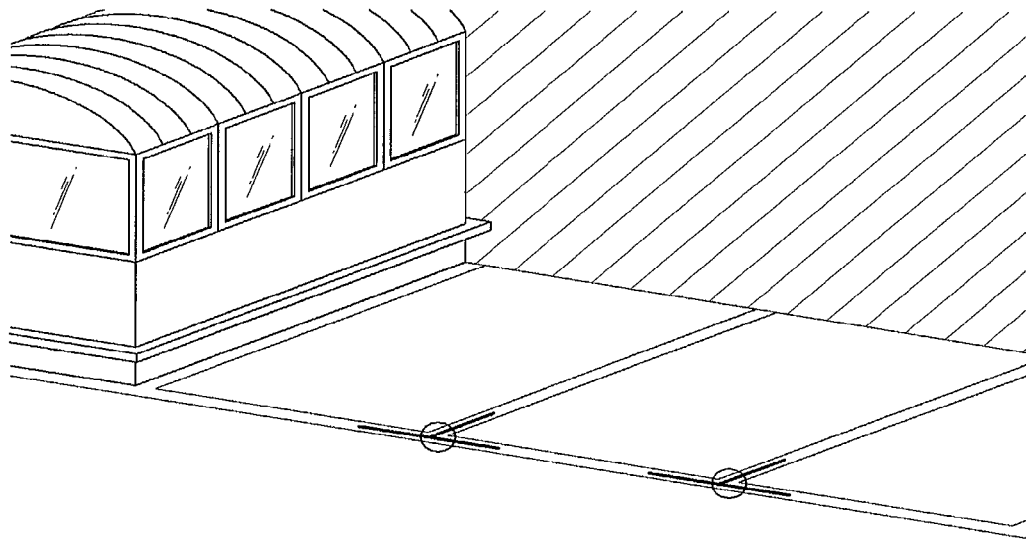
FIGS. 21A and 21B are illustrative views showing a result of detecting a target parking position of the rectangular parking slot markings.
Figure 21:
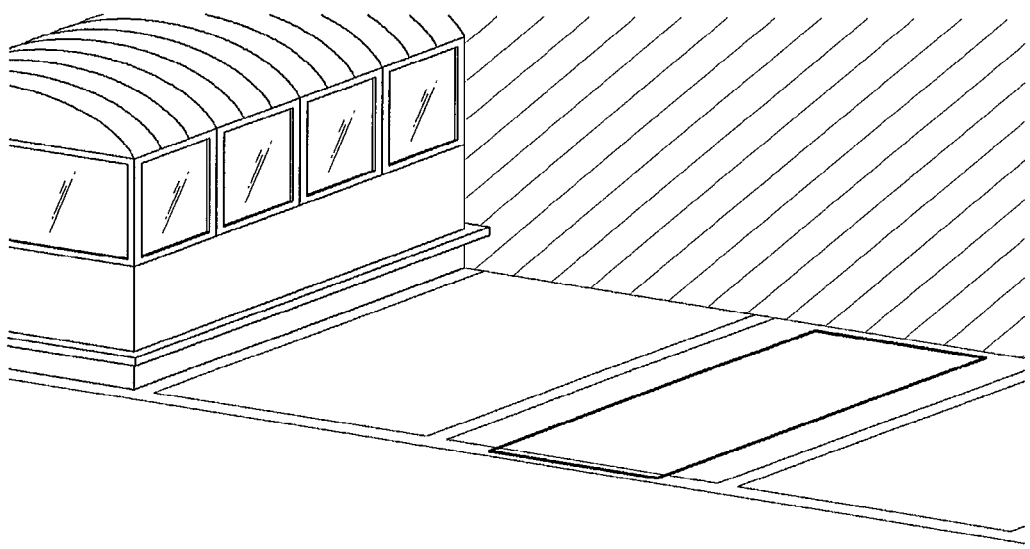

FIGS. 21A and 21B are illustrative views showing a result of detecting a target parking position of the rectangular parking slot markings.

FIG. 21A shows a result of detecting a T-shaped target pattern. FIG. 21B shows the result of detecting the target parking position of the rectangular parking slot markings.

FIGS. 22A and 22B are illustrative views showing a result of detecting a target parking position when another marking is painted in front of the parking slot markings.

FIG. 22A shows a result of detecting a target pattern when another marking is painted in front of the parking slot markings. FIG. 22B shows the result of detecting the target parking position when another marking is painted in front of the parking slot markings.

Figure 22:
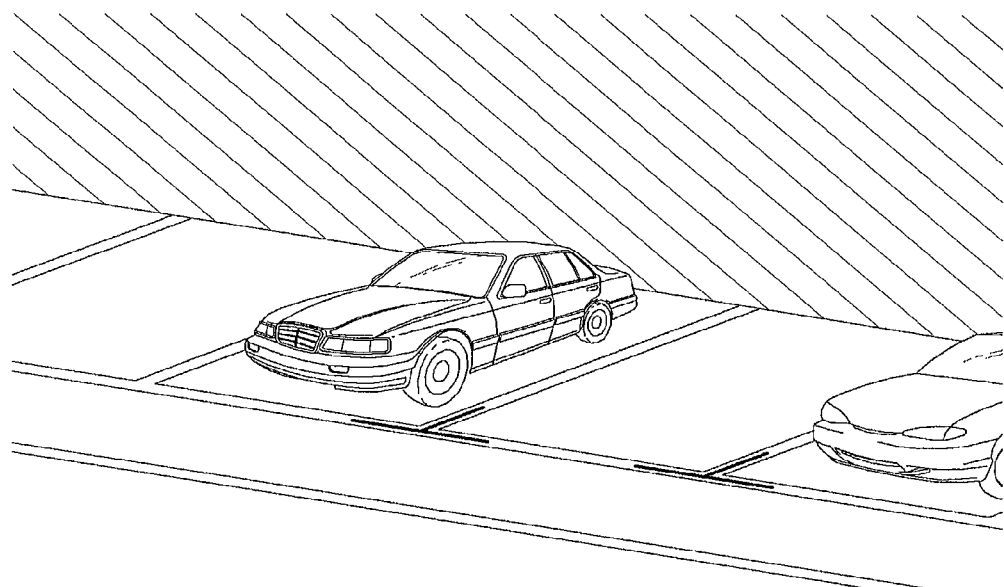
FIGS. 22A and 22B are illustrative views showing a result of detecting a target parking position when another marking is painted in front of the parking slot markings.
Figure 22:
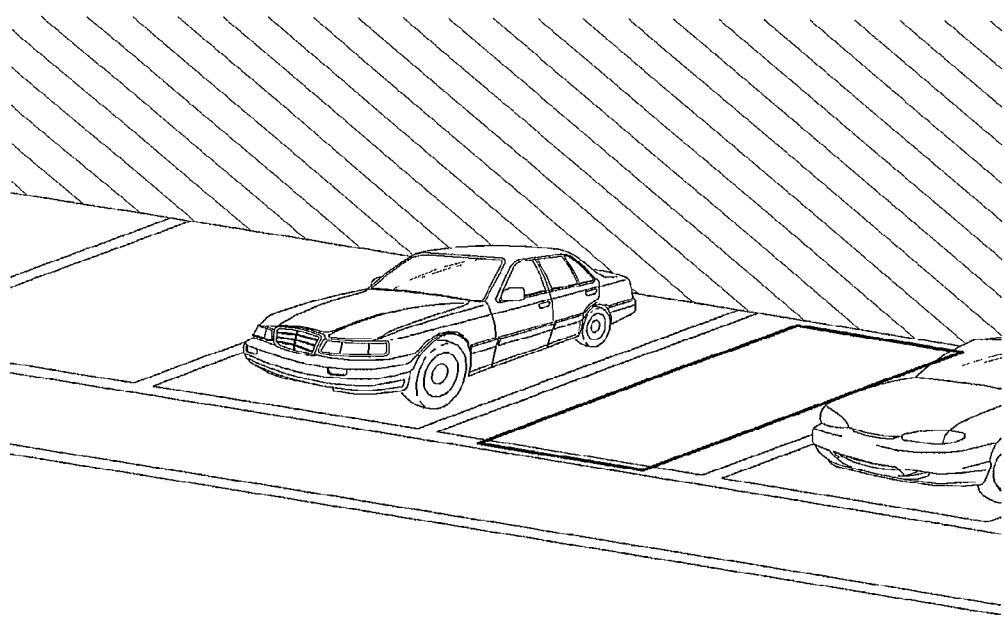

Particularly, when another marking is painted in front of the parking slot markings as shown in FIG. 22, a conventional method for detecting a target parking position, such as a method for receiving one reference point, has difficulty in normally recognizing the parking slot markings, due to the another marking. Accordingly, the conventional method has difficulty in detecting a target parking position. However, the method and the apparatus for detecting a target parking position according to the embodiment of the present invention can easily recognize the parking slot markings having another marking, as described above referring to the drawings.

This is because, in the embodiment of the present invention, the target parking position is detected by using only nearby images of the two reference points indicated by the driver.

Figure 23:
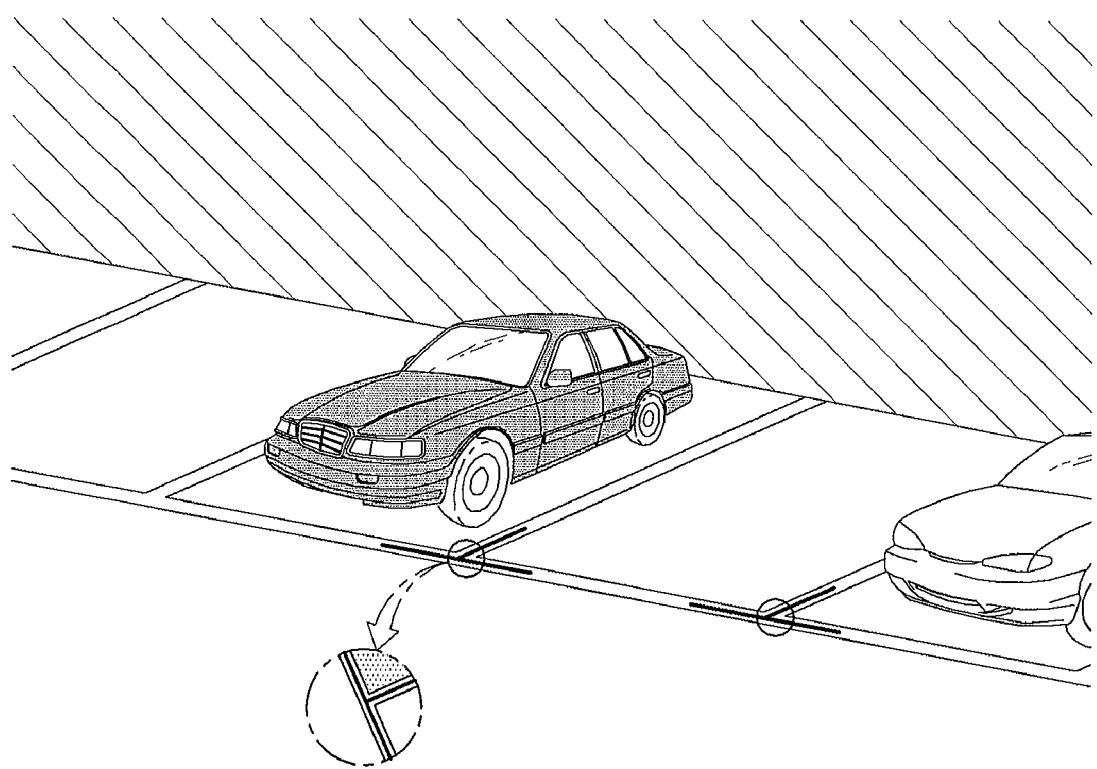
FIG. 23 is an illustrative view showing a result of detecting a target pattern when a brightness difference is significant between the target parking position and a zone around the target parking position.

FIG. 23 is an illustrative view showing a result of detecting a target pattern when a brightness difference is significant between the target parking position and a zone around the target parking position.

For the same reasons as described above, even when a parked vehicle is located just beside a target parking position and a bright difference is significant between the target parking position and a zone around the target parking position, as shown in FIG. 23, the method and the apparatus of the present invention can easily and accurately detect a target pattern, and can accurately detect the target parking position by using the detected target patterns.

FIGS. 24A and 24B are illustrative views showing a result of detecting a target parking position when a driver indicates distant parking slot markings.

FIG. 24A shows a result of detecting a target pattern. FIG. 24B shows the result of detecting the target parking position.

Figure 24:
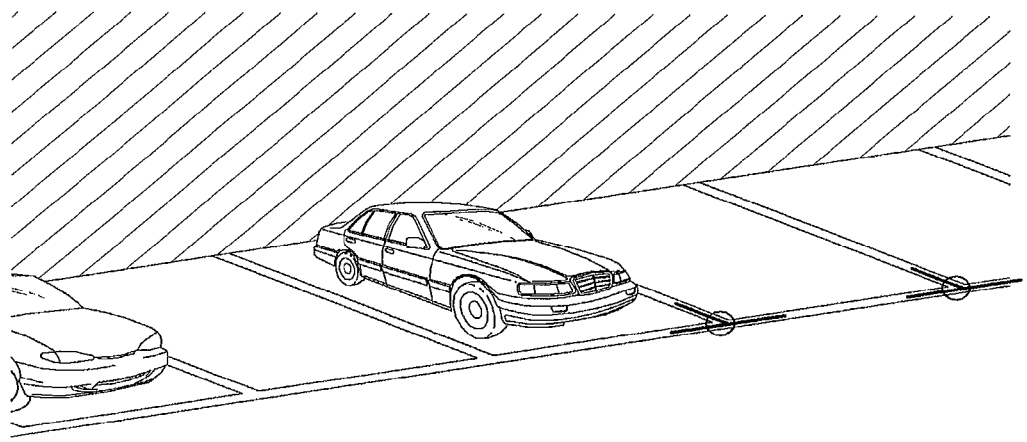
FIGS. 24A and 24B are illustrative views showing a result of detecting a target parking position when a driver indicates distant parking slot markings.
Figure 24:
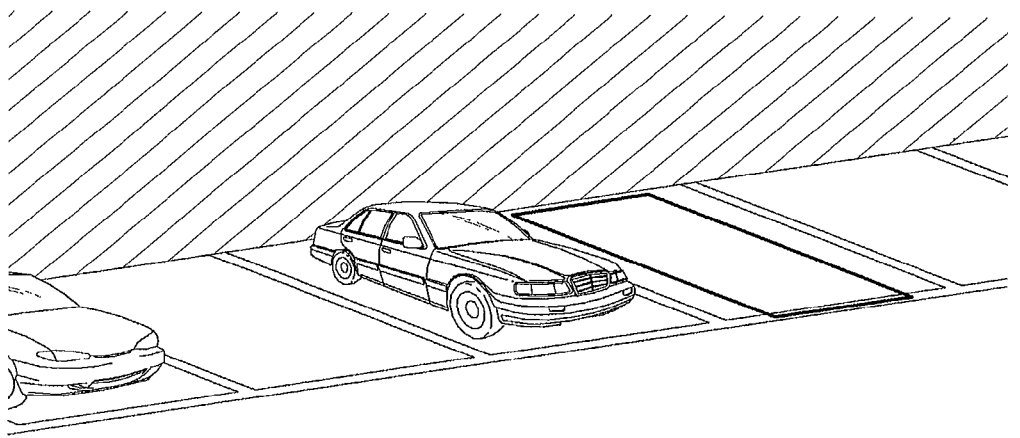

Even when a driver inputs an end part of parking slot markings of a parking slot, which is at a distance from the camera 110, as two reference points in an input image obtained by photographing a parking space, a target pattern and the target parking position can be accurately detected as shown in FIG. 24.

FIGS. 25A, 25B, 25C, 25D, 25E, and 25F are illustrative views showing a process for detecting a target pattern when the driver indicates the distant parking slot markings.

FIGS. 25A, 25B, and 25C all show a process for detecting a first target pattern. FIGS. 25D, 25E, and 25F all show a process for detecting a second target pattern.

Figure 25:
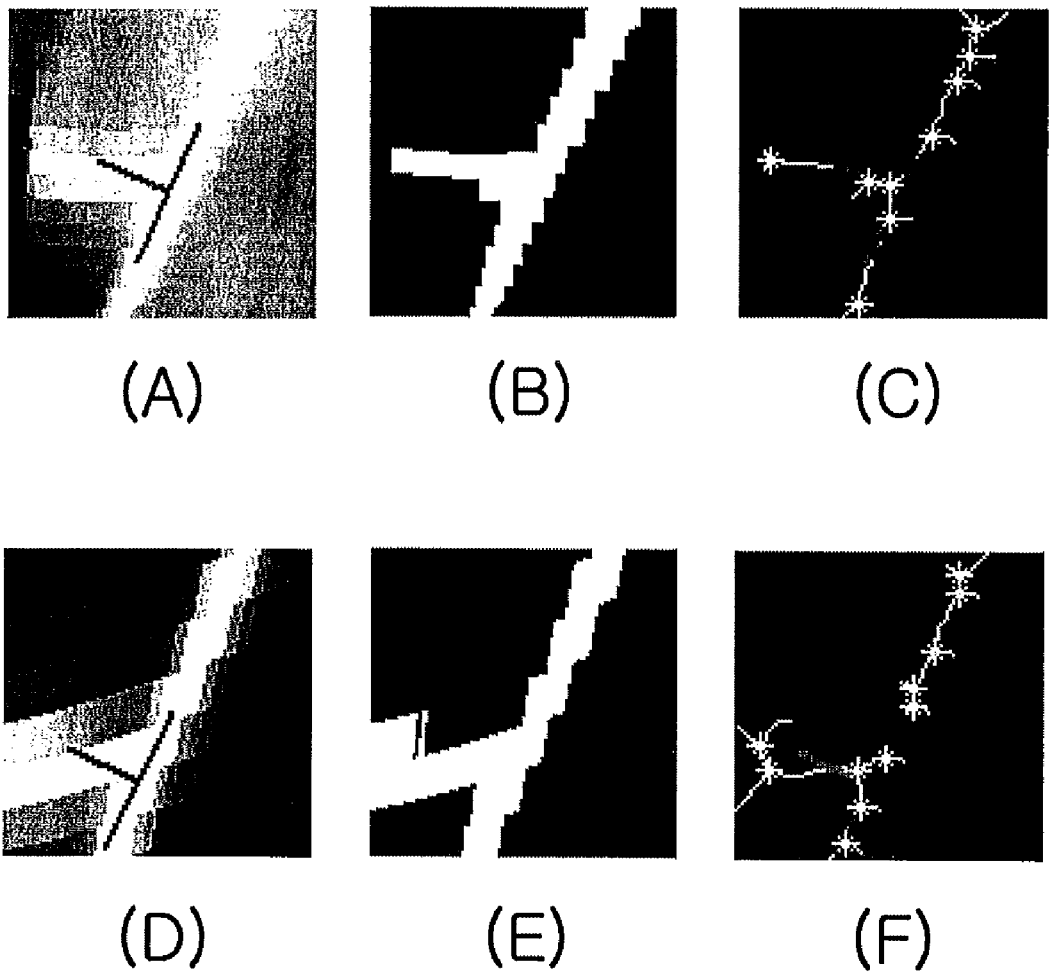
FIGS. 25A, 25B, 25C, 25D, 25E, and 25F are illustrative views showing a process for detecting a target pattern when the driver indicates the distant parking slot markings.

As shown in FIG. 25, an image around each of the two reference points includes much distortion. However, according to the embodiment of the present invention, the parking slot markings can be successfully detected by using over-clustering, so that a target pattern can be successfully detected by using the extracted skeleton.

As described above, when the driver inputs ends of separation lines on both sides of a target parking slot, at which he/she intends to park, as two reference points on a touch-screen, the method and the apparatus of the embodiment of the present invention recognizes the right and left of an entrance of the target parking slot, and detects a target parking position by using the recognized right and left of the entrance.

The recognition of the end of each separation line is to recognize a position and an orientation of a target pattern which is different depending on each parking slot marking pattern. Since a different target pattern can be defined depending on each parking slot marking pattern, the embodiment of the present invention is applied in various examples of parking slot markings of various types.

According to the embodiment of the present invention, a target pattern is defined and detected for rectangular parking slot markings and 11-shaped parking slot markings, so that a target parking position can be set. The method for detecting a target pattern uses a scheme for performing a distance transform on a skeleton or an outer edge of the parking slot markings and searching for parameters minimizing an error on a target pattern template. By defining an error based on the distance transform, the target pattern can be successfully recognized even when the parking slot markings include much noise.

Although exemplary embodiments of the present invention have been described for illustrative purposes, those skilled in the art will appreciate that various modifications, additions and substitutions are possible without departing from the scope and spirit of the present invention as disclosed in the accompanying claims. Therefore, the embodiments disclosed in the present invention do not restrict but describes the idea of the art in the present invention, and do not restrict the scope of the idea of the art in the present invention. The scope of protection of the present invention should be interpreted by the appended claims, and all ideas of the arts falling within the scope equivalent to the appended claims should be interpreted as falling within the scope of right of the present invention.

What is claimed is:

1. An apparatus for detecting a target parking position by using two reference points, the apparatus comprising:
    a first unit for receiving an input image obtained by photographing a parking space and the two reference points in the input image;
    an initial direction setting unit for determining an initial direction of the target parking position by using the two reference points when receiving the input image and the two reference points in the input image;
    a target pattern detection unit for detecting a target pattern of parking slot markings by using each of the two reference points; and
    a target parking position calculation unit for detecting the target parking position by using the detected target patterns, and for providing the detected target parking position.

2. The apparatus as claimed in claim 1, wherein the apparatus detects the target pattern in an image of a part having a predetermined distance from each of the two reference points in the input image.

3. The apparatus as claimed in claim 1, wherein the apparatus detects a different target pattern, depending on each parking slot marking pattern.

4. The apparatus as claimed in claim 1, wherein, when a pattern of the parking slot markings is rectangular, the apparatus generates a rectified image by converting an image of a part having a predetermined distance from each of the two reference points into a bird's-eye view image, clusters the rectified image into multiple clusters according to brightness and detects a brightest cluster as the parking slot markings, extracts a skeleton of the detected parking slot markings, calculates a position and an orientation of a target pattern template by performing a distance transform on the extracted skeleton, and detects a T-shaped target pattern as the target pattern by minimizing errors of the calculated position and orientation.

5. The apparatus as claimed in claim 1, wherein, when a pattern of the parking slot markings is 11-shaped, the apparatus generates a rectified image by converting an image of a part having a predetermined distance from each of the two reference points into a bird's-eye view image, clusters the rectified image into multiple clusters according to brightness and detects a brightest cluster as the parking slot markings, extracts an outer edge of the detected parking slot markings, calculates a position, an orientation and a marking width of a target pattern template by performing a distance transform on the extracted outer edge, and detects a II-shaped target pattern as the target pattern by minimizing errors of the calculated position, orientation, and marking width.

6. The apparatus as claimed in claim 1, wherein the apparatus detects, as the target parking position, a quadrangle which has, as a side, a straight line with both the same length as a distance between the two target patterns and the same length as a width of a vehicle on a straight line connecting the one target pattern to the other, and which has the same side as a length of the vehicle.

7. A system for assisting parking of a vehicle, the system comprising:
    a camera for generating and providing an input image upon photographing a parking space;
    a user interface unit for receiving as an input and delivering two reference points in the input image;
    a target parking position detection unit for detecting a target pattern of parking slot markings by using each of the two reference points upon receiving the input image and the two reference points, detecting a target parking position by using the detected target patterns, and providing the detected target parking position;
    a sensing unit having multiple sensors for recognizing a driving situation of the vehicle, the sensing unit generating and providing information on the driving situation of the vehicle;
    a parking assist control unit for receiving the information on the driving situation of the vehicle from the sensing unit and estimating a position of the vehicle based on the received information, receiving the target parking position to generate both path planning and a control signal for parking the vehicle in the target parking position, and providing the generated path planning and control signal;
    an active steering unit for steering the vehicle in response to the control signal when receiving the control signal; and
    an active braking unit for braking the vehicle in response to the control signal when receiving the control signal.

8. A method for detecting a target parking position by an apparatus for detecting the target parking position, the apparatus being connected to a camera and a user interface mounted on a vehicle, the method comprising:
    receiving an input image obtained by photographing a parking space from the camera;
    receiving two reference points in the input image from the user interface;
    determining an initial direction of the target parking position by using the two reference points when receiving the input image and the two reference points in the input image;
    detecting a target pattern of parking slot markings by using each of the two reference points; and
    detecting the target parking position by using the detected target patterns, and providing the detected target parking position.

9. The method as claimed in claim 8, wherein the detecting a target pattern of parking slot markings by using each of the two reference points comprises:
    when a pattern of the parking slot markings is rectangular, converting an image of a part having a predetermined distance from each of the two reference points into a bird's-eye view image, and generating a rectified image;
    clustering the rectified image into multiple clusters according to brightness, and detecting a brightest cluster as the parking slot markings; and
    extracting a skeleton of the detected parking slot markings, calculating a position and an orientation of a target pattern template by performing a distance transform on the extracted skeleton, and detecting the target pattern by minimizing errors of the calculated position and orientation.

10. The method as claimed in claim 8, wherein the detecting a target pattern of parking slot markings by using each of the two reference points comprises:

when a pattern of the parking slot markings is 11-shaped, converting an image of a part having a predetermined distance from each of the two reference points into a bird's-eye view image, and generating a rectified image;

clustering the rectified image into multiple clusters according to brightness, and detecting a brightest cluster as the parking slot markings; and extracting an outer edge of the detected parking slot markings, calculating a position, an orientation and a marking width of a target pattern template by performing a distance transform on the extracted outer edge, and detecting the target pattern by minimizing errors of the calculated position, orientation and marking width.

* * * * *